US012801161B2

(12) United States Patent
Hirata et al.

(10) Patent No.: US 12,801,161 B2
(45) Date of Patent: Nov. 17, 2026

(54) CONTROL DEVICE, CONTROL METHOD, AND STORAGE MEDIUM

(71) Applicant: HONDA MOTOR CO., LTD., Tokyo (JP)

(72) Inventors: Hironori Hirata, Tokyo (JP); Masashi Kanesaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/066,170

(22) Filed: Feb. 28, 2025

(65) Prior Publication Data

US 2025/0306605 A1 Oct. 2, 2025

(30) Foreign Application Priority Data

Mar. 27, 2024 (JP) ................................ 2024-050841

(51) Int. Cl.
*G05D 1/226* (2024.01)
*B60W 30/06* (2006.01)
(Continued)

(52) U.S. Cl.
CPC ............. *G05D 1/65* (2024.01); *B60W 40/105* (2013.01); *B62D 1/00* (2013.01); *B62D 15/0285* (2013.01);
(Continued)

(58) Field of Classification Search
CPC .......... G05D 1/65; G05D 1/224; G05D 1/226; G05D 1/249; G05D 1/43; G05D 1/622;
(Continued)

(56) References Cited

U.S. PATENT DOCUMENTS 10,632,993 B2 * 4/2020 Horiguchi ............. B60W 30/08
12,169,408 B2 * 12/2024 Yahata ................. G05D 1/0223
(Continued)

FOREIGN PATENT DOCUMENTS

JP 2018-065441 A 4/2018
JP 2020-138611 A 9/2020
(Continued)

OTHER PUBLICATIONS

Nov. 25, 2025, Translation of Japanese Office Action issued for related JP Application No. 2024-050841.

*Primary Examiner* — Sohana Tanju Khayer
(74) *Attorney, Agent, or Firm* — Paratus Law Group, PLLC

(57) ABSTRACT

A control device for a moving object, the control device includes: a communication unit configured to communicate with an information terminal carried by a user of the moving object; an external environment recognition unit configured to acquire external environment recognition data of the moving object; and a control unit configured to perform movement control of the moving object based on an instruction from the information terminal. Depending on a distance between the moving object and the information terminal, the control unit switches between a first control that controls a movement speed of the moving object in the movement control based on a state of the communication, and a second control that controls the movement speed of the moving object in the movement control based on the external environment recognition data.

14 Claims, 16 Drawing Sheets

(51) Int. Cl.

| | |
|---|---|
| ***B60W 40/105*** | (2012.01) |
| ***B62D 1/00*** | (2006.01) |
| ***B62D 15/02*** | (2006.01) |
| ***G05D 1/222*** | (2024.01) |
| ***G05D 1/224*** | (2024.01) |
| ***G05D 1/249*** | (2024.01) |
| ***G05D 1/43*** | (2024.01) |
| ***G05D 1/622*** | (2024.01) |
| ***G05D 1/65*** | (2024.01) |
| ***G06F 21/32*** | (2013.01) |
| ***G06V 20/56*** | (2022.01) |
| ***G06V 40/16*** | (2022.01) |
| *G05D 105/22* | (2024.01) |
| *G05D 107/13* | (2024.01) |
| *G05D 109/10* | (2024.01) |
| *G05D 111/30* | (2024.01) |

(52) U.S. Cl.

CPC ............. *G05D 1/224* (2024.01); *G05D 1/226* (2024.01); *G05D 1/249* (2024.01); *G05D 1/43* (2024.01); *G05D 1/622* (2024.01); *G06F 21/32* (2013.01); *G06V 20/56* (2022.01); *G06V 40/172* (2022.01); *B60W 30/06* (2013.01); *G05D 1/222* (2024.01); *G05D 2105/22* (2024.01); *G05D 2107/13* (2024.01); *G05D 2109/10* (2024.01); *G05D 2111/30* (2024.01)

(58) Field of Classification Search

CPC ............... G05D 1/222; G05D 2105/22; G05D 2107/13; G05D 2109/10; G05D 2111/30; B60W 40/105; B60W 30/06; B62D 1/00; B62D 15/0285; G06F 21/32; G06V 20/56; G06V 40/172

See application file for complete search history.

(56) References Cited

U.S. PATENT DOCUMENTS

| | | | | | |
|---|---|---|---|---|---|
| 12,591,839 | B2 * | 3/2026 | Gustafsson | G06Q 10/0833 | |
| 2009/0009306 | A1 * | 1/2009 | Magane | G01S 15/931 | 340/435 |
| 2016/0194002 | A1 * | 7/2016 | Kelly | B60W 10/18 | 701/93 |
| 2018/0126986 | A1 * | 5/2018 | Kim | B60K 28/06 | |
| 2019/0004508 | A1 * | 1/2019 | Bonander | B62D 15/0285 | |
| 2019/0283736 | A1 * | 9/2019 | Watanabe | B60W 30/06 | |
| 2020/0072619 | A1 * | 3/2020 | Fukui | G05D 1/0088 | |
| 2020/0269756 | A1 | 8/2020 | Yamanaka et al. | | |
| 2021/0157335 | A1 | 5/2021 | Shimamoto et al. | | |
| 2021/0396532 | A1 * | 12/2021 | Tamori | G05D 1/0276 | |
| 2021/0397191 | A1 * | 12/2021 | Nakai | G05D 1/0217 | |
| 2021/0407031 | A1 * | 12/2021 | Gulati | G06Q 10/06312 | |
| 2022/0004185 | A1 * | 1/2022 | Kim | B60Q 1/50 | |
| 2022/0019218 | A1 * | 1/2022 | Tamori | G08G 1/207 | |
| 2022/0257074 | A1 * | 8/2022 | Shim | A47L 9/2805 | |
| 2022/0289138 | A1 * | 9/2022 | Gammelgard | G05B 13/0265 | |
| 2022/0301430 | A1 * | 9/2022 | Sudo | H04N 7/183 | |
| 2022/0396292 | A1 * | 12/2022 | Benmimoun | B60K 35/10 | |
| 2023/0077036 | A1 * | 3/2023 | Yamaguchi | B60W 30/16 | |
| 2023/0234587 | A1 * | 7/2023 | Ito | B60W 30/16 | 701/96 |
| 2023/0368517 | A1 * | 11/2023 | Yoshikawa | G06V 10/764 | |
| 2024/0069564 | A1 * | 2/2024 | Yuki | G01C 21/3804 | |
| 2024/0211819 | A1 * | 6/2024 | Nakamura | G08G 1/096816 | |
| 2025/0021106 | A1 | 1/2025 | Yamada et al. | | |
| 2025/0098923 | A1 * | 3/2025 | Sun | G05D 1/6485 | |
| 2025/0128709 | A1 * | 4/2025 | Liu | B60L 15/2045 | |
| 2025/0290339 | A1 * | 9/2025 | Tang | G05D 1/241 | |
| 2025/0306605 | A1 * | 10/2025 | Hirata | G05D 1/222 | |
| 2026/0073683 | A1 * | 3/2026 | Choi | G06T 11/00 | |
| 2026/0073793 | A1 * | 3/2026 | Wan | G08G 1/143 | |
| 2026/0078625 | A1 * | 3/2026 | Mizokawa | E05F 15/73 | |

FOREIGN PATENT DOCUMENTS

| | | | |
|---|---|---|---|
| JP | 7000401 | B2 | 1/2022 |
| WO | WO 2023/187890 | A1 | 10/2023 |

* cited by examiner

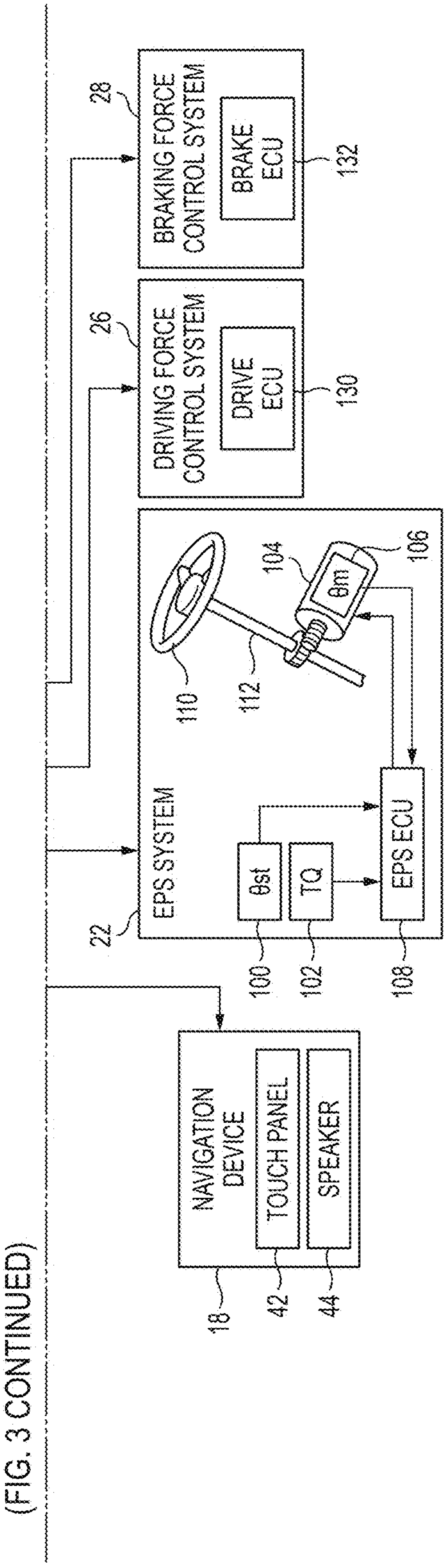
(FIG. 3 CONTINUED)

CONTROL DEVICE, CONTROL METHOD, AND STORAGE MEDIUM

CROSS-REFERENCE TO RELATED APPLICATIONS

This application is based upon and claims the benefit of priority from prior Japanese patent application No. 2024-50841, filed on Mar. 27, 2024, the entire contents of which are incorporated herein by reference.

TECHNICAL FIELD

The present disclosure relates to a control device, a control method, and a storage medium storing a control program.

BACKGROUND ART

In recent years, efforts have been made to provide access to a sustainable transportation system in consideration of people vulnerable among traffic participants. In order to implement the above, focus has been placed on research and development on further improving safety and convenience of traffic by research and development related to self-driving techniques.

In the related art, there is known a remote parking system that remotely operates a vehicle using a smartphone to park the vehicle in a designated predetermined parking space or to cause the vehicle to exit from a parking space.

For example, JP7000401B2 describes a vehicle control device that controls movement of a vehicle via an instruction from a remote operation terminal outside the vehicle, and determines whether the vehicle can be operated by remote control based on a difference between a distance between the vehicle and an operator and a distance between the vehicle and the remote operation terminal, and prohibits operation of the remote control, when, for example, a position of the operator and a position of the remote operation terminal are separated by more than a predetermined distance, or no operator is detected.

SUMMARY OF INVENTION

However, in a case of a large parking lot such as a public parking lot, when a vehicle is called to exit from a parking position to a predetermined exit position, a calling distance may be long depending on the parking position, and therefore, there were issues such as the time it takes for the vehicle to reach the exit position is long and a user who calls the vehicle needs to perform remote operations for a long period of time. However, JP7000401B2 does not describe how to deal with these issues.

Aspects of the present disclosure relate to providing a control device, a control method, and a storage medium storing a control program that are capable of performing efficient movement control on a moving object while ensuring safety.

According to an aspect of the present disclosure, there is provided a control device for a moving object, the control device including:

- a communication unit configured to communicate with an information terminal carried by a user of the moving object;
- an external environment recognition unit configured to acquire external environment recognition data of the moving object; and
- a control unit configured to perform movement control of the moving object based on an instruction from the information terminal, in which
- depending on a distance between the moving object and the information terminal, the control unit switches between a first control in which a movement speed of the moving object in the movement control is controlled based on a state of the communication, and a second control the movement speed of the moving object in the movement control is controlled based on the external environment recognition data.

According to another aspect of the present disclosure, there is provided a control method using a control device for a moving object, the control device including a communication unit configured to communicate with an information terminal carried by a user of the moving object; an external environment recognition unit configured to acquire external environment recognition data of the moving object; and a control unit configured to perform movement control of the moving object based on an instruction from the information terminal, the control method including:

- depending on a distance between the moving object and the information terminal, switching, by the control unit, between a first control in which a movement speed of the moving object in the movement control is controlled based on a state of the communication, and a second control in which the movement speed of the moving object in the movement control is controlled based on the external environment recognition data.

According to another aspect of the present disclosure, there is provided a non-transitory computer-readable storage medium storing a control program for a control device for a moving object, the control device including a communication unit configured to communicate with an information terminal carried by a user of the moving object; an external environment recognition unit configured to acquire external environment recognition data of the moving object; and a control unit configured to perform movement control of the moving object based on an instruction from the information terminal, the control program causing the control unit to execute a process including:

- depending on a distance between the moving object and the information terminal, switching between a first control in which a movement speed of the moving object in the movement control is controlled based on a state of the communication, and a second control in which the movement speed of the moving object in the movement control is controlled based on the external environment recognition data.

According to aspects of the present disclosure, a control device, a control method, and a storage medium storing a control program that are capable of performing efficient movement control on a moving object while ensuring safety may be provided.

BRIEF DESCRIPTION OF DRAWINGS

Exemplary embodiment(s) of the present invention will be described in detail based on the following figures, wherein.

DESCRIPTION OF EMBODIMENTS

Figure 1:
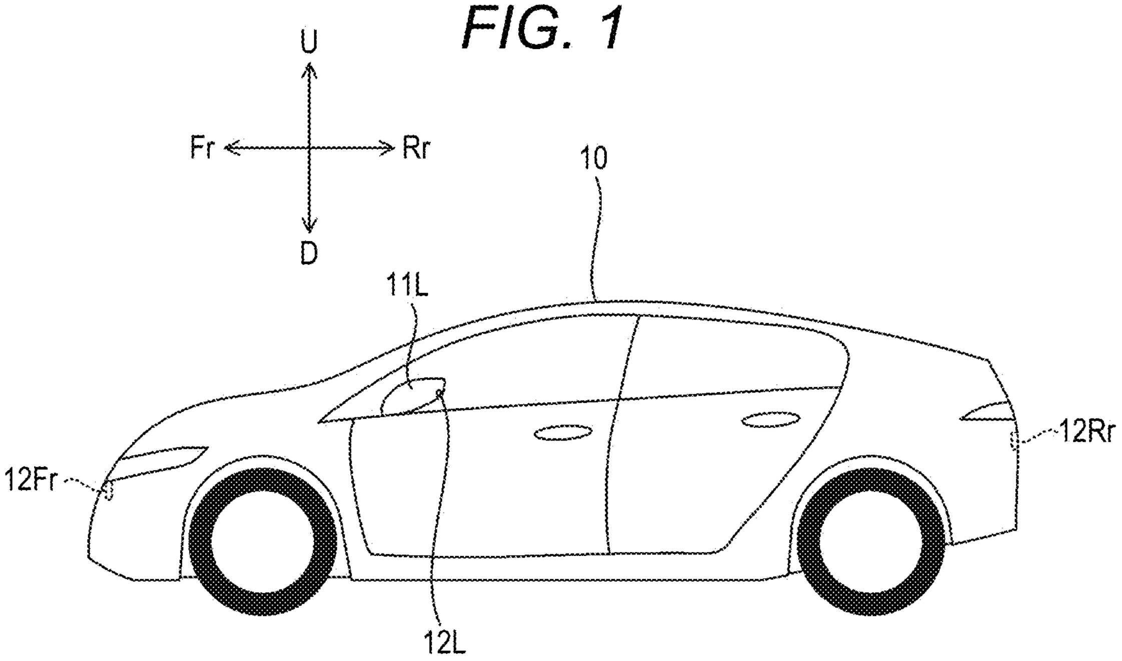
FIG. 1 is a side view of an example of a vehicle 10 equipped with a control device according to the present disclosure.

Hereinafter, an embodiment of a control device, a control method, and a storage medium storing a control program in the present disclosure will be described with reference to the accompanying drawings. Note that the drawings are viewed in directions of reference numerals. In order to simplify and clarify the description in the present specification or the like, a front-rear direction, a left-right direction, and an upper-lower direction are described according to directions viewed from a driver of a vehicle 10 shown in FIGS. 1 and 2. In the drawings, a front side of the vehicle 10 is shown as Fr, a rear side is shown as Rr, a left side is shown as L, a right side is shown as R, an upper side is shown as U, and a lower side is shown as D.

Vehicle 10 Equipped with Control Device

Figure 2:
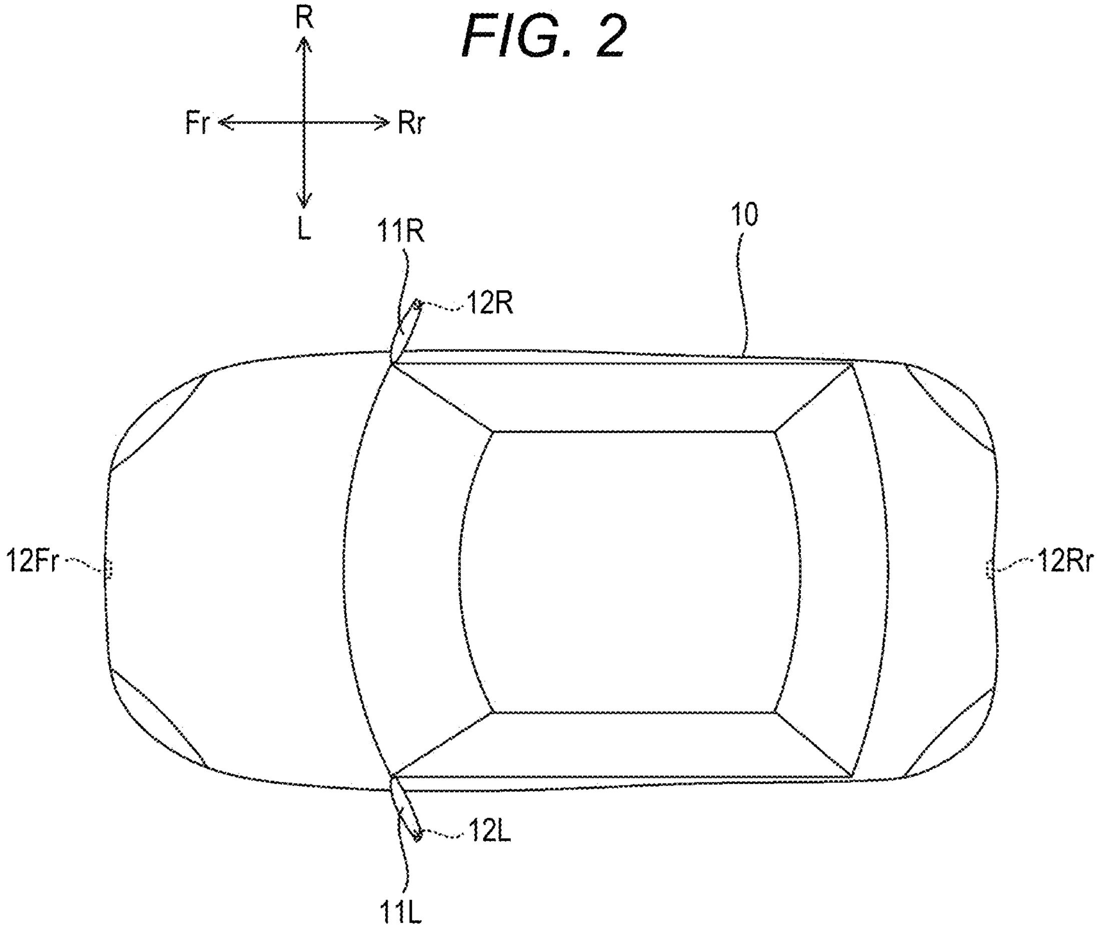
FIG. 2 is a top view of the vehicle 10 shown in FIG. 1.

FIG. 1 is a side view of an example of the vehicle 10 equipped with a control device in the present disclosure. FIG. 2 is a top view of the vehicle 10 shown in FIG. 1. The vehicle 10 is an example of a "moving object" in the present disclosure.

The vehicle 10 is an automobile including a drive source (not shown) and wheels including drive wheels driven by power of the drive source and steerable steered wheels. In the present embodiment, the vehicle 10 is a four-wheeled automobile having a pair of left and right front wheels and a pair of left and right rear wheels. The drive source of the vehicle 10 is, for example, an electric motor. Note that the drive source of the vehicle 10 may be an internal combustion engine such as a gasoline engine or a diesel engine, or a combination of an electric motor and an internal combustion engine. The drive source of the vehicle 10 may drive the pair of left and right front wheels, the pair of left and right rear wheels, or four wheels including the pair of left and right front wheels and the pair of left and right rear wheels. The front wheels and the rear wheels may all be steerable steered wheels, or the front wheels or the rear wheels may be steerable steered wheels.

The vehicle 10 further includes side mirrors 11L and 11R. The side mirrors 11L and 11R are mirrors (back mirrors) provided on outer sides of front seat doors of the vehicle 10 for the driver to check the rear side and rear lateral sides. The side mirrors 11L and 11R are fixed to a body of the vehicle 10 by rotation shafts extending in a vertical direction, and may be opened and closed by rotating about the rotation shafts.

The vehicle 10 further includes a front camera 12Fr, a rear camera 12Rr, a left side camera 12L, and a right side camera 12R. The front camera 12Fr is an imaging device (for example, a digital camera) that is provided on the front side of the vehicle 10 and captures an image in a forward direction of the vehicle 10. The rear camera 12Rr is a digital camera that is provided on the rear side of the vehicle 10 and captures an image in a rearward direction of the vehicle 10. The left side camera 12L is a digital camera that is provided on the left side mirror 11L of the vehicle 10 and captures an image in a leftward direction of the vehicle 10. The right side camera 12R is a digital camera that is provided on the right side mirror 11R of the vehicle 10 and captures an image in a rightward direction of the vehicle 10.

Internal Configuration of Vehicle 10

Figure 3:
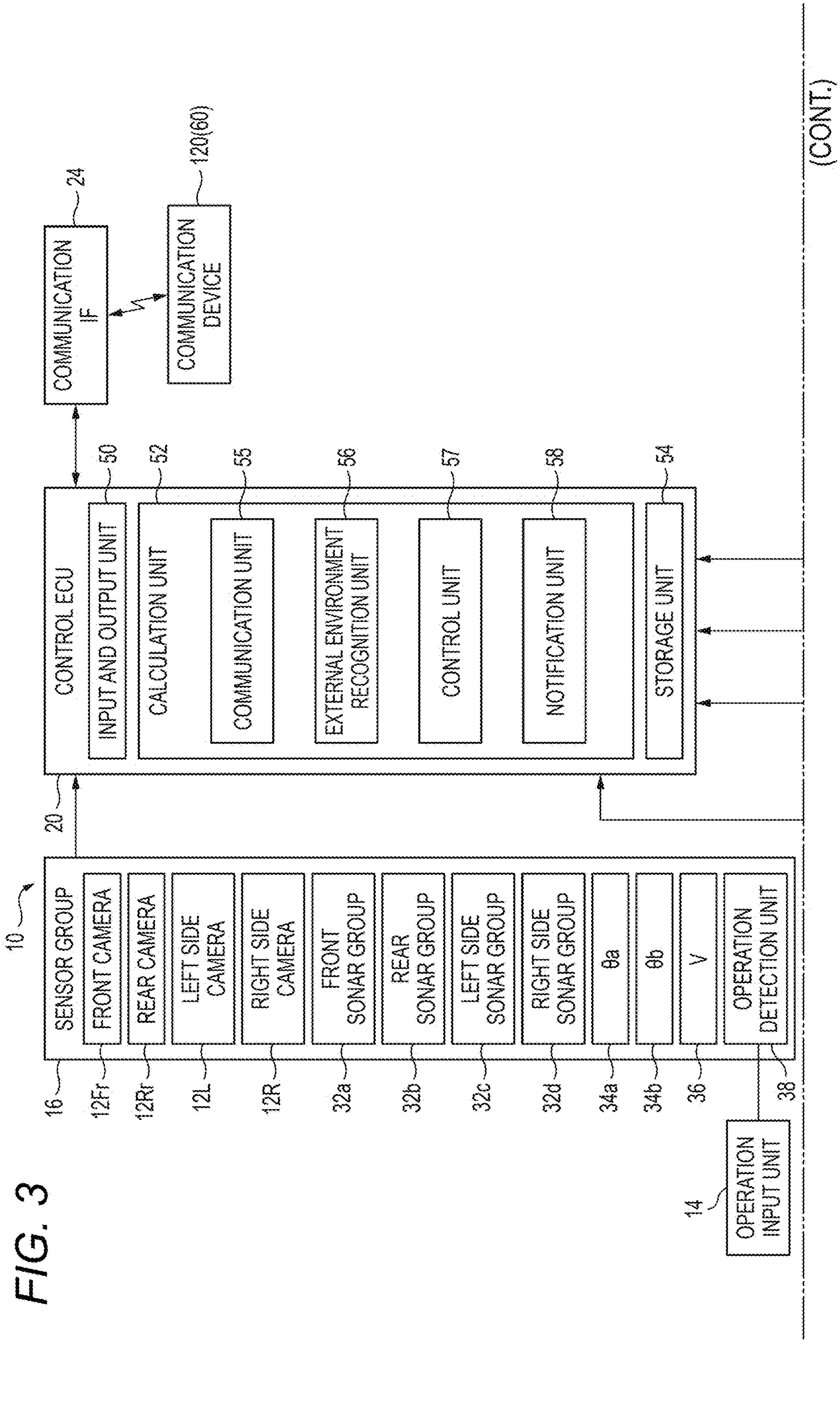
FIG. 3 is a block diagram showing an example of an internal configuration of the vehicle 10 shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication Interface (IF) 24. The vehicle 10 further includes a driving force control system 26 and a braking force control system 28.

The sensor group 16 acquires various detection values used for control by the control ECU 20. The sensor group 16 includes the front camera 12Fr, the rear camera 12Rr, the left side camera 12L, and the right side camera 12R. The sensor group 16 also includes a front sonar group 32*a*, a rear sonar group 32*b*, a left side sonar group 32*c*, and a right side sonar group 32*d*. The sensor group 16 includes wheel sensors 34*a* and 34*b*, a vehicle speed sensor 36, and an operation detection unit 38.

The front camera 12Fr, the rear camera 12Rr, the left side camera 12L, and the right side camera 12R acquire external environment recognition data (for example, peripheral images) for recognizing an external environment of the vehicle 10 by capturing images of a periphery of the vehicle 10. The peripheral images of the vehicle 10 captured by the front camera 12Fr, the rear camera 12Rr, the left side camera 12L, and the right side camera 12R are referred to as a front image, a rear image, a left side image, and a right side image, respectively. An image constituted by the left side image and the right side image may be referred to as a side image. An image of the vehicle 10 and the periphery of the vehicle, which is generated by combining captured images from the front camera 12Fr, the rear camera 12Rr, the left side camera 12L, and the right side camera 12R, is referred to as a top view image of the vehicle 10.

The front sonar group 32*a*, the rear sonar group 32*b*, the left side sonar group 32*c*, and the right side sonar group 32*d* emit sound waves to the periphery of the vehicle 10, and receive reflected sounds from other objects. The front sonar group 32*a* includes, for example, four sonars. The sonars that constitute the front sonar group 32*a* are respectively provided on an obliquely left front side, a front left side, a front right side, and an obliquely right front side of the vehicle 10. The rear sonar group 32*b* includes, for example, four sonars. The sonars that constitute the rear sonar group 32*b* are respectively provided on an obliquely left rear side, a rear left side, a rear right side, and an obliquely right rear side of the vehicle 10. The left side sonar group 32*c* includes, for example, two sonars. The sonars that constitute the left side sonar group 32*c* are provided at a left side front portion and a left side rear portion of the vehicle 10, respectively. The right side sonar group 32*d* includes, for example, two sonars. The sonars that constitute the right side sonar group 32*d* are provided at a right side front portion and a right side rear portion of the vehicle 10, respectively.

The wheel sensors 34*a* and 34*b* detect rotation angles of the wheels of the vehicle 10. The wheel sensors 34*a* and 34*b* may be implemented by angle sensors or displacement sensors. The wheel sensors 34*a* and 34*b* output detection pulses each time the wheels rotate by a predetermined angle. The detection pulses output from the wheel sensors 34*a* and 34*b* are used to calculate rotation angles and rotation speeds of the wheels. A movement distance of the vehicle 10 is calculated based on the rotation angles of the wheels. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a transmission countershaft.

The operation detection unit 38 detects an operation content of a user performed using an operation input unit 14, and outputs the detected operation content to the control ECU 20. The operation input unit 14 includes various user interfaces such as a side mirror switch that switches between opened and closed states of the side mirrors 11L and 11R, and a shift lever (a selector lever or a selector).

The navigation device 18 detects a current position of the vehicle 10 by using, for example, a global positioning system (GPS), and guides the user along a route to a destination. The navigation device 18 includes a storage device (not shown) including a map information database. The navigation device 18 also includes a touch panel 42 and a speaker 44. The touch panel 42 functions as an input device and a display device of the control ECU 20. The speaker 44 outputs various types of guidance information to the user of the vehicle 10 by voice.

The touch panel 42 enables input of various commands to the control ECU 20. For example, the user may input a command related to movement assistance of the vehicle 10 via the touch panel 42. The movement assistance includes parking assistance and exiting assistance of the vehicle 10. The touch panel 42 displays various screens related to control contents of the control ECU 20. For example, the touch panel 42 displays a screen related to the movement assistance of the vehicle 10. Specifically, the touch panel 42 displays a parking assistance button for requesting parking assistance of the vehicle 10 and an exiting assistance button for requesting exiting assistance. The parking assistance button includes a remote parking button for requesting parking by automatic steering of the control ECU 20, and a support parking button for requesting support while parking the vehicle by an operation of the user. The exiting assistance button includes a remote exiting button for requesting exiting by the automatic steering of the control ECU 20, and a support exiting button for requesting support while exiting by an operation of the user. Note that a constituent element other than the touch panel 42, for example, an information terminal such as a smartphone or a tablet may be used as the input device or the display device.

Note that the "parking" is synonymous with, for example, "parking". The "parking" is, for example, a stop as an occupant gets on or off the vehicle, and excludes a temporary stop due to a traffic signal or the like. Further, a "parking position" is a position where the moving object (vehicle 10) is stopped, that is, a parking position.

The control ECU 20 includes an input and output unit 50, a calculation unit 52, and a storage unit 54. The calculation unit 52 is implemented by, for example, a central processing unit (CPU). The calculation unit 52 executes various types of control by controlling units based on a program stored in the storage unit 54. The calculation unit 52 receives and outputs signals from and to units connected to the control ECU 20 via the input and output unit 50. The control ECU 20 is an example of a "control device" in the present disclosure. The storage unit 54 stores information related to remote movement of the vehicle 10

The calculation unit 52 includes a communication unit 55 that communicates with the outside of the vehicle 10, an external environment recognition unit 56 that recognizes an external environment recognition image of the vehicle 10, a control unit 57 that controls the remote movement of the vehicle 10, and a notification unit 58 that notifies movement information of the vehicle 10.

The communication unit 55 performs wireless communication with another communication device 120 via the communication IF 24. Another communication device 120 includes a base station, a communication device of another vehicle, an information terminal 60 such as a smartphone or a tablet that is portable for the user of the vehicle 10, and the like. The communication unit 55 transmits and receives information relating to the remote movement of the vehicle 10 to and from the information terminal 60 and the like via the communication IF 24.

The external environment recognition unit 56 acquires the external environment recognition data indicating external environment recognition results of the vehicle 10 captured by the front camera 12Fr, the rear camera 12Rr, the left side camera 12L, and the right side camera 12R from the cameras.

The control unit 57 performs remote parking assistance and remote exiting assistance of the vehicle 10 through automatic steering in which a steering 110 is automatically operated under control of the control unit 57. In the remote parking assistance and the remote exiting assistance, an accelerator pedal (not shown), a brake pedal (not shown), and the operation input unit 14 are automatically operated. The control unit 57 performs support parking assistance and support exiting assistance when the user (driver) operates the accelerator pedal, the brake pedal, and the operation input unit 14 to perform manual parking and manual exiting of the vehicle 10. Note that during the remote parking assistance and the remote exiting assistance, the user may be in a state of being present in the vehicle 10, or may be in a state of getting off the vehicle 10 and being outside (not being present in the vehicle).

For example, the control unit 57 performs the movement control for executing movement of the vehicle 10 based on the external environment recognition data of the vehicle 10 acquired by the front camera 12Fr, the rear camera 12Rr, the left side camera 12L, and the right side camera 12R, and a predetermined parking space specified by the user. The movement control includes parking control for remotely parking the vehicle 10 in a predetermined parking space (parking position) and exiting control for remotely causing the vehicle 10 to exit from a parking space to a predetermined target position (exit position). The control unit 57 executes the parking control and the exiting control based on an instruction signal input via the input and output unit 50. The input instruction signal includes an instruction signal transmitted by wireless communication from an information terminal 60 or the like that is possessed by the user of the vehicle 10. The control unit 57 outputs information related to the parking control and the exiting control to the information terminal 60 or the like via the input and output unit 50.

Specifically, the control unit 57 controls the movement speed of the vehicle 10 in the movement control using different control methods based on a distance between a position of the vehicle 10 and a position of the information terminal 60. For example, when the distance between the vehicle 10 and the information terminal 60 is equal to or greater than a first predetermined value, the control unit 57 performs a first control to control the movement speed of the vehicle 10 based on a communication status with the information terminal 60. When the distance between the vehicle 10 and the information terminal 60 is less than the first predetermined value, the control unit 57 performs a second control to control the movement speed of the vehicle 10 based on external environment recognition data acquired by cameras and the like. The first predetermined value is, for example, a distance at which a face of the user carrying the information terminal 60 cannot be recognized in an image captured by a camera. The control unit 57 switches the control of the movement speed of the vehicle 10 in the movement control between the first control and the second control based on the distance between the vehicle 10 and the information terminal 60. The “distance” between the vehicle 10 and the information terminal 60 is measured by wireless communication (for example, ultra wide band (UWB: registered trademark) communication) performed between the vehicle 10 and the information terminal 60.

For example, in the first control, the control unit 57 determines whether a first confirmation state is established in which the user can confirm the vehicle 10 based on the communication status with the information terminal 60, and controls the movement speed of the vehicle 10 in the movement control based on the determination result.

In the first control, when a section between the vehicle 10 and the information terminal 60 is a linear section, the control unit 57 determines that the first confirmation state is established in which the user can confirm the vehicle 10. A linear section refers to an unobstructed peripheral environment from the user carrying the information terminal 60 to the position of the vehicle 10, for example. The unobstructed peripheral environment includes, for example, a state in which there are no obstacles that may impede communication between the vehicle 10 and the information terminal 60. In the first control, when the information terminal 60 is directed toward the vehicle 10, the control unit 57 determines that the first confirmation state is established in which the user can confirm the vehicle 10. Being directed means that, based on the communication status with the information terminal 60, for example, a back surface of the information terminal 60 is directed toward the vehicle 10 when viewed in a plan view, and it can be inferred that the user is looking at the vehicle 10.

In the first control, when it is determined that the first confirmation state is established, the control unit 57 increases the movement speed of the vehicle 10 in the movement control as compared with when it is determined that the first confirmation state is not established. When it is determined that the first confirmation state is not established, the control unit 57 performs a notification to prompt the user to confirm the vehicle 10 via the notification unit 58. Prompting to confirm means, for example, prompting the user to move to a position where the vehicle 10 can be seen, or prompting the user to look towards the vehicle 10.

For example, in the second control, the control unit 57 determines whether a second confirmation state is established in which the user is confirming the vehicle 10 based on external environment recognition data acquired by the cameras and the like, and controls the movement speed of the vehicle 10 in the movement control based on the determination result.

In the second control, when the user is detected based on the external environment recognition data, the control unit 57 determines that the second confirmation state is established in which the user is confirming the vehicle 10. The case where the user is detected refers to a case where the face of the user is detected, for example. The face of the user is a face that can be determined as the user being confirming the vehicle 10. Whether the user is confirming the vehicle 10 may be determined by, for example, whether the eyes or face of the user is directed toward the vehicle 10.

The control unit 57 performs the movement control of the vehicle 10 while image authentication of the user is performed in the information terminal 60, receives feature information of the user acquired during the image authentication of the information terminal 60 from the information terminal 60, and in the second control, detects the user based on the external environment recognition data and the feature information of the user. The feature information of the user includes, for example, features of the face of the user, clothing of the user, and hairstyle of the user.

By detecting the user, the control unit 57 narrows down an acquisition area of the external environment recognition data by the cameras and the like to a position where the user corresponding to the stored feature information is present. For example, in object detection (person detection) based on the external environment recognition data (camera image), when a person who highly matches the feature information is detected, the control unit 57 monitors a state of the user while focusing on his or her peripheral area. Alternatively, in the object detection (person detection) based on the external environment recognition data (camera image), the control unit 57 simply detects a person who highly matches the feature information of the user.

In the second control, when it is determined that the second confirmation state is established, the control unit 57 increases the movement speed of the vehicle 10 in the movement control as compared with when it is determined that the second confirmation state is not established. When it is determined that the second confirmation state is not established, the control unit 57 performs a notification to prompt the user to confirm the vehicle 10 via the notification unit 58. Prompting the user to confirm means, for example, prompting the user to find (confirm) the vehicle 10 and turn his or her face toward the vehicle 10.

In the first control, the control unit 57 determines whether the first confirmation state is established in which the user can confirm the vehicle 10 based on a state of communication with the information terminal 60, and if it is determined that the first confirmation state is established, sets the movement speed of the vehicle 10 in the movement control to the first speed that is higher than when it is determined that the first confirmation state is not established. In the second control, when it is determined that the second confirmation state is established based on external environment recognition data acquired by the cameras and the like, the control unit 57 sets the movement speed of the vehicle 10 in the movement control to a second speed that is higher than when it is determined that the second confirmation state is not established and higher than the first speed in the first control.

In the movement control of the vehicle 10, the control unit 57 increases the movement speed of the vehicle 10 in the movement control when a distance between the vehicle 10 and an obstacle around vehicle 10 is equal to or greater than a second predetermined value, as compared with when the distance between the vehicle 10 and the obstacle is less than the second predetermined value.

For example, when it is determined that the first confirmation state in which the user can confirm the vehicle 10 is not established, the notification unit 58 performs a notification to prompt the user to confirm the vehicle 10. When it is determined that the second confirmation state in which the user is confirming the vehicle 10 is not established, the notification unit 58 also performs a notification to prompt the user to confirm the vehicle 10. The notification may be performed by, for example, the navigation device 18 of the vehicle 10, or the information terminal 60 of the user.

The EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 applies a driving force or a reaction force to a steering column 112 coupled to the steering 110, thereby providing support for an operation of an occupant on the steering 110 and automatic steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication IF 24 enables wireless communication with another communication device 120. For example, the communication IF 24 includes an ultra wide band (UWB, registered trademark) interface or the like that can execute UWB communication with the information terminal 60.

The driving force control system 26 includes a drive ECU 130. The driving force control system 26 executes driving force control of the vehicle 10. The drive ECU 130 controls a driving force of the vehicle 10 by controlling an engine (not shown) or the like based on an operation performed by the user on the accelerator pedal (not shown).

The braking force control system 28 includes a brake ECU 132. The braking force control system 28 executes braking force control of the vehicle 10. The brake ECU 132 controls a braking force of the vehicle 10 by controlling a brake mechanism or the like (not shown) based on an operation performed by the user on the brake pedal (not shown).

Hardware Configuration of Information Terminal 60 of User

Figure 4:
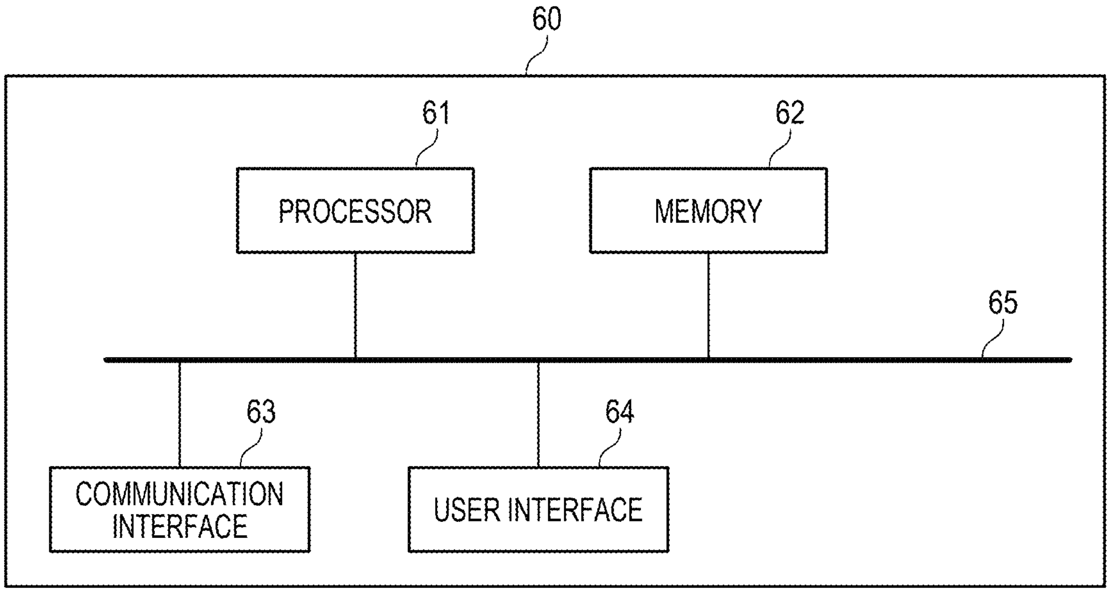
FIG. 4 is a diagram showing an example of a hardware configuration of an information terminal 60 owned by a user of the vehicle 10.

FIG. 4 is a diagram showing an example of a hardware configuration of the information terminal 60 owned by the user of the vehicle 10. The information terminal 60 includes a processor 61, a memory 62, a communication interface 63, and a user interface 64. The processor 61, the memory 62, the communication interface 63, and the user interface 64 are connected by, for example, a bus 65.

The processor 61 is a circuit that executes signal processing, and is, for example, a central processing unit (CPU) that controls the entire information terminal 60. Note that the processor 61 may be implemented by another digital circuit such as a field programmable gate array (FPGA) or a digital signal processor (DSP). The processor 61 may also be implemented by combining a plurality of digital circuits.

The memory 62 includes, for example, a main memory and an auxiliary memory. The main memory is, for example, a random access memory (RAM). The main memory is used as a work area of the processor 61.

The auxiliary memory is a non-volatile memory such as a magnetic disk, an optical disk, or a flash memory. The auxiliary memory stores various programs for operating the information terminal 60. The programs stored in the auxiliary memory are loaded into the main memory and executed by the processor 61.

The auxiliary memory may include a portable memory removable from the information terminal 60. Examples of the portable memory include a universal serial bus (USB) flash drive, a memory card such as a secure digital (SD) memory card, and an external hard disk drive.

The communication interface 63 is a communication interface that executes wireless communication with the outside of the information terminal 60 (for example, the communication IF 24 of the vehicle 10). For example, the communication interface 63 includes a UWB interface for executing UWB communication with the vehicle 10. The communication interface 63 is controlled by the processor 61.

The user interface 64 includes, for example, an input device that receives an operation input from the user and an output device that outputs information to the user. The input device may be implemented by, for example, a touch panel. The output device may be implemented by, for example, a display or a speaker. The user interface 64 is controlled by the processor 61.

The processor 61 executes movement instruction control for instructing movement of the vehicle 10. For example, the processor 61 performs the movement instruction control (including the parking instruction control and the exiting instruction control) on the vehicle 10 based on a specific operation of the user on a terminal screen of the information terminal 60. The specific operation includes, for example, a tap operation for instructing parking and exiting (calling) of the vehicle 10, and a slide operation for moving the vehicle 10. The slide operation includes a continuous position instruction operation (for example, swiping operation), a rotation instruction operation in a predetermined rotation direction (for example, rotation swiping operation), and the like. The processor 61 further executes control to generate a guidance image for prompting the user to perform an instruction operation on the display screen of the information terminal 60 and display the generated guidance image on the display screen.

The processor 61 transmits, to the vehicle 10, a parking instruction for remotely parking the vehicle 10 and an exiting instruction for remotely causing the vehicle 10 to exit based on a specific operation on the display screen of the information terminal 60. An application configured to cause the vehicle 10 to perform automatic movement (remote parking, remote exiting) by transmitting and receiving information related to the movement control of the vehicle 10 to and from the vehicle 10 is installed in the information terminal 60.

Processing of Information Terminal 60

Figure 5:
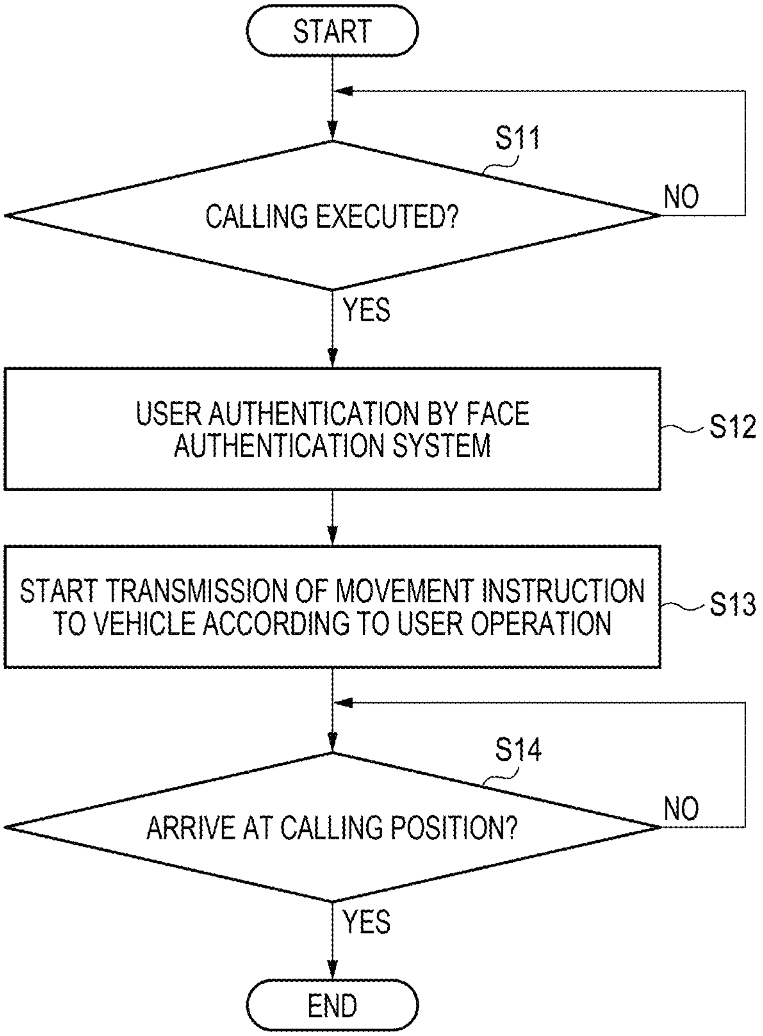
FIG. 5 is a flowchart showing an example of processing of the information terminal 60 during exiting of the vehicle 10.

FIG. 5 is a flowchart showing an example of processing of the information terminal 60 during exiting of the vehicle 10.

The information terminal 60 (processor 61) determines whether calling is executed by the user to call for the vehicle 10 to an exit position (step S11). The vehicle 10 is called by starting an application for remotely causing the vehicle 10 to exit, which is installed on the information terminal 60, and tapping an execution button.

In step S11, if calling is not executed (step S11: No), the information terminal 60 repeats the determination of step S11. In step S11, if calling is executed (step S11: Yes), the information terminal 60 performs user authentication using a face authentication system (step S12). The user authentication is performed by obtaining feature information of the user from a facial image of the user captured by a camera of the information terminal 60, and determining whether the user is registered as a user of the vehicle 10 based on the acquired feature information.

Next, the information terminal 60 starts transmitting a movement instruction to the vehicle 10 according to a user operation on the display screen of the information terminal 60 (step S13). As described above, the user operation includes a tap operation, a swiping operation, a rotation swiping operation, and the like. The information terminal 60 continues to transmit a signal of the movement instruction while, for example, a rotation swiping operation by the user is continuing, and stops transmitting the movement instruction (or may transmit a stop instruction) when the operation is stopped. The user operation on the display screen will be described later with reference to FIG. 6.

Next, the information terminal 60 determines whether the vehicle 10 arrives at a calling position, which is the exit position to which the vehicle 10 is called (step S14).

In step S14, if the vehicle 10 does not arrive at the calling position (step S14: No), the information terminal 60 repeats the determination of step S14. In step S14, if the vehicle 10 arrives at the calling position (step S14: Yes), the information terminal 60 ends this processing.

Display Screen on Information Terminal 60

Figure 6:
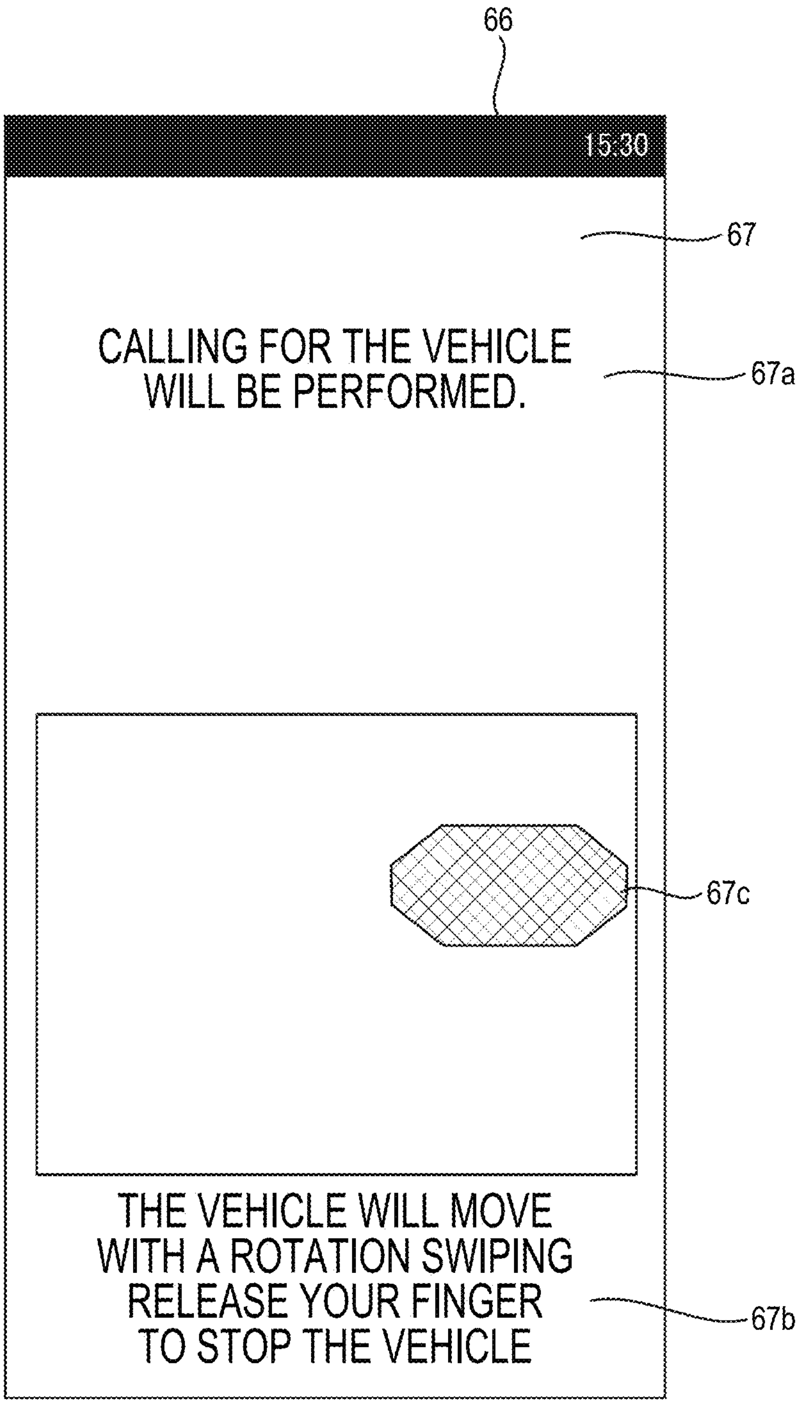
FIG. 6 is a diagram showing an example of a calling instruction screen 67 displayed on a display screen 66 of the information terminal 60.

FIG. 6 is a diagram showing an example of a calling instruction screen 67 displayed on a display screen 66 of the information terminal 60. The calling instruction screen 67 is an example of the screen displayed in step S13 of FIG. 5. The user can call the vehicle 10 to the exit position by performing a specific operation on the calling instruction screen 67.

As shown in FIG. 6, the calling instruction screen 67 displays a message 67*a* such as "Calling for the vehicle will be performed." The calling instruction screen 67 also displays a guide message 67*b* that provides guidance on an operation content, such as "The vehicle will be moved by rotation swiping. Release your finger to stop the vehicle." The calling instruction screen 67 displays, for example, a moving icon 67*c* that moves following a touch position of the user in a rotation swiping operation.

Processing of Vehicle 10

Figure 7:
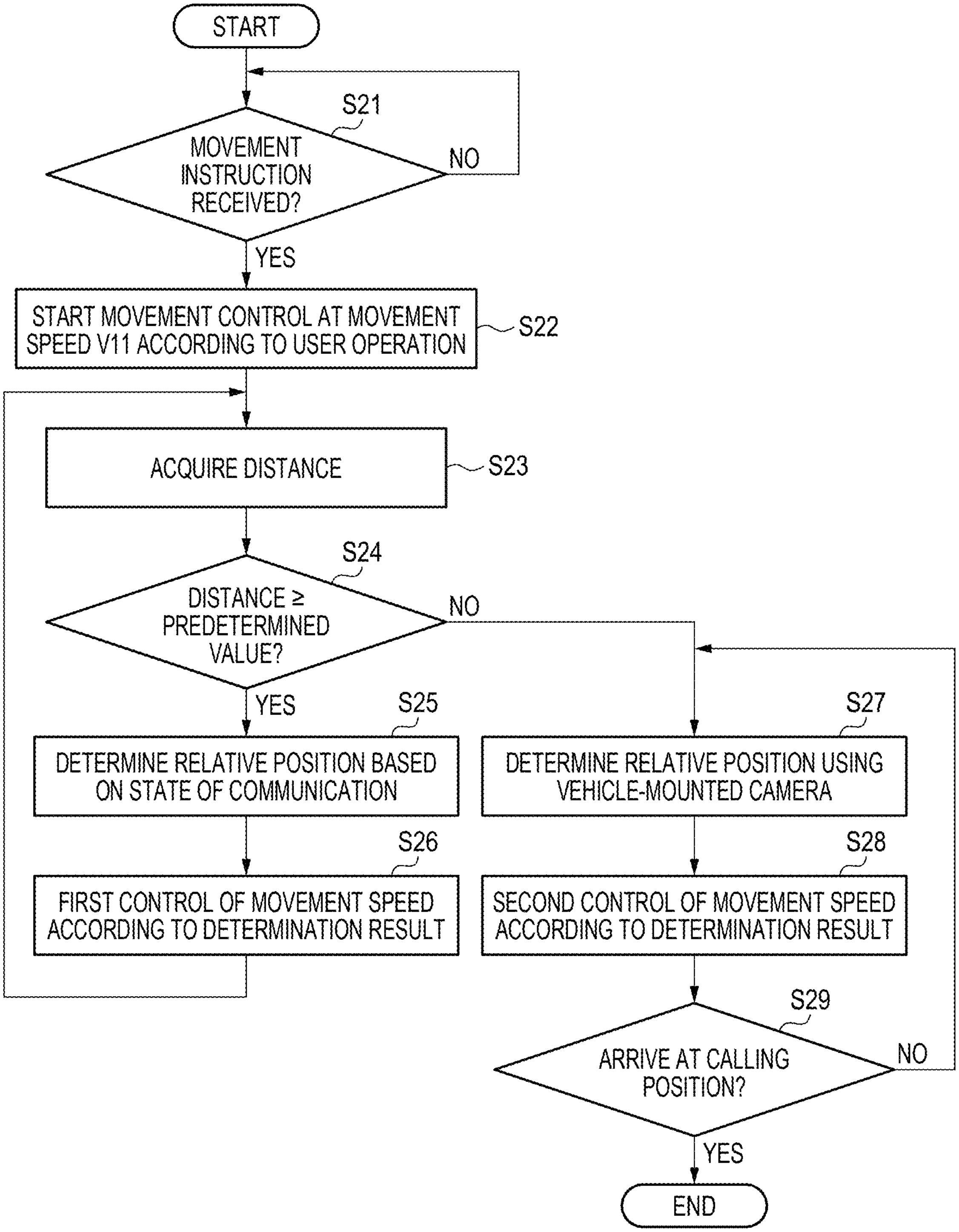
FIG. 7 is a flowchart showing an example of processing of the vehicle 10 during exiting.

FIG. 7 is a flowchart showing an example of processing of the vehicle 10 during exiting.

The vehicle 10 (control ECU 20) determines whether a movement instruction instructing exiting of the vehicle 10 is received from the information terminal 60 (step S21).

In step S21, if a movement instruction is not received from the information terminal 60 (step S21: No), the vehicle 10 repeats the determination of step S21. In step S21, if a movement instruction is received from the information terminal 60 (step S21: Yes), the vehicle 10 starts movement control according to a user operation at a movement speed V11 (step S22). As described in step S13 of FIG. 5, the user operation includes specific operations such as a tap operation, a swiping operation, and a rotation swiping operation. The vehicle 10 stops the movement control when it is unable to receive a movement instruction from the information terminal 60 or when a stop instruction is received from the information terminal 60.

Next, the vehicle 10 acquires the distance between the vehicle 10 and the information terminal 60 (step S23). The distance between the vehicle 10 and the information terminal 60 is measured by UWB communication between the vehicle 10 and the information terminal 60.

The vehicle 10 determines whether the distance between the vehicle 10 and the information terminal 60 acquired in step S23 is equal to or greater than a predetermined value (step S24).

In step S24, if the distance between the vehicle 10 and the information terminal 60 is equal to or greater than a predetermined value (step S24: Yes), the vehicle 10 determines a relative position based on the state of communication with the information terminal 60 (step S25). Determining the relative position based on the state of communication means determining whether a state (first confirmation state) is established in which the vehicle 10 can be confirmed by the user who carries the information terminal 60, based on the communication status with the information terminal 60. The case where the first confirmation state is established refers to a case where a section between the vehicle 10 and the information terminal 60 is a linear section, or a case where the information terminal 60 is directed toward the vehicle 10 (a case where it can be assumed that the user is looking at the vehicle 10). This determination of the relative position can be performed, for example, by using the function of UWB communication. Alternatively, this determination of the relative position may be performed using a three-dimensional sensor such as LiDAR in addition to or instead of communication such as UWB communication.

Next, the vehicle 10 performs the first control to move the vehicle 10 at a movement speed according to the determination result of step S25 (step S26). That is, when the relative position of the vehicle 10 with respect to the information terminal 60 is in the first confirmation state, the movement speed of the vehicle 10 in the movement control is made higher than when the relative position of the vehicle 10 is not in the first confirmation state.

Next, the vehicle 10 returns to step S23 and repeats the processing of each step.

On the other hand, in step S24, if the distance between the vehicle 10 and the information terminal 60 is not equal to or greater than the predetermined value (step S24: No), the vehicle 10 determines a relative position using a vehicle-mounted camera (step S27). Determining the relative position using the vehicle-mounted camera means determining whether a state (second confirmation state) in which the user is confirming the vehicle 10 is established based on the external environment recognition data acquired by the camera. The second confirmation state refers to, for example, a case where the face of the user is detected based on the external environment recognition data. Note that in order to identify the user of the information terminal 60, for example, information stored in advance as a feature of the user may be used.

Next, the vehicle 10 performs the second control to move the vehicle 10 at a movement speed according to the determination result of step S27 (step S28). That is, when the relative position of the vehicle 10 with respect to the information terminal 60 is in the second confirmation state, the movement speed of the vehicle 10 in the movement control is made higher than when the relative position of the vehicle 10 is not in the second confirmation state.

Next, it is determined whether the vehicle 10 arrives at a calling position, which is the exit position called by the information terminal 60 (step S29). In step S29, if the vehicle 10 does not arrive at the calling position (step S29: No), the vehicle 10 returns to step S27 and repeats the processing of each step. In step S29, if the vehicle 10 arrives at the calling position (step S29: Yes), the vehicle 10 ends this processing.

First Control of Movement Speed

Figure 8:
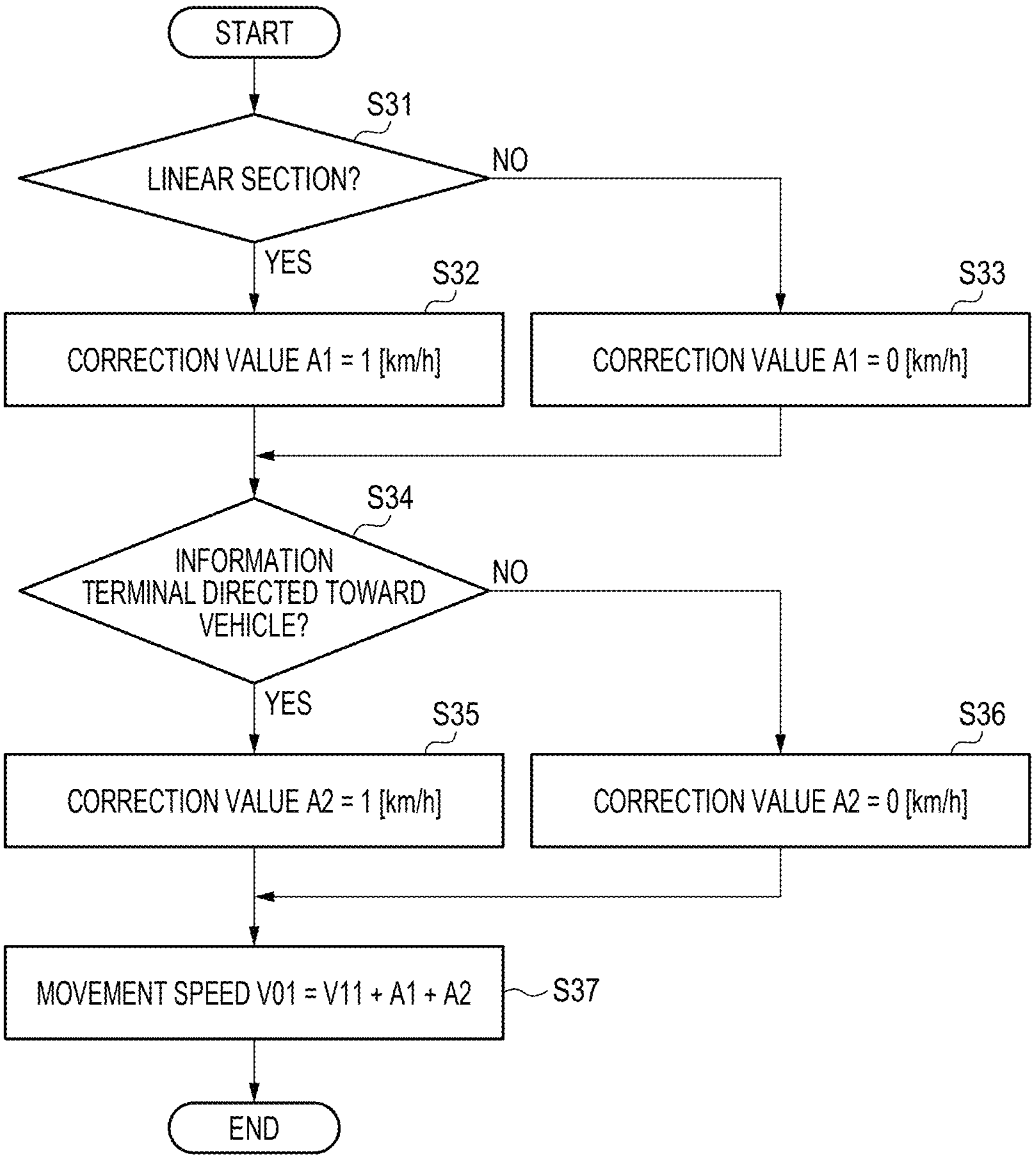
FIG. 8 is a flowchart showing an example of a first control of a movement speed according to a determination result.

FIG. 8 is a flowchart showing an example of the first control of the movement speed according to the determination result. The first control is the control in step S26 in FIG. 7.

First, the vehicle 10 determines whether the section between the vehicle 10 and the information terminal 60 is a linear section (step S31). In step S31, if the section between the vehicle 10 and the information terminal 60 is a linear section (step S31: Yes), the vehicle 10 sets a correction value A1 for adjusting the movement speed of the vehicle 10 to A1=1 [km/h] (step S32). In step S31, if the section between the vehicle 10 and the information terminal 60 is not a linear section (step S31: No), the vehicle 10 sets the correction value A1 for adjusting the movement speed of the vehicle 10 to A1=0 [km/h] (step S33).

After setting the correction value A1 in step S32 or step S33, the vehicle 10 determines whether the information terminal 60 is directed toward the vehicle 10 (it can be assumed that the user is looking at the vehicle 10) (step S34). In step S34, if the information terminal 60 is directed toward the vehicle 10 (step S34: Yes), the vehicle 10 sets the correction value A2 for adjusting the movement speed of the vehicle 10 to A2=1 [km/h] (step S35). In step S34, if the information terminal 60 is not directed toward the vehicle 10 (step S34: No), the vehicle 10 sets the correction value A2 for adjusting the movement speed of the vehicle 10 to A2=0 [km/h] (step S36).

After setting the correction value A2 in step S35 or step S36, the vehicle 10 sets a movement speed V01 of the vehicle 10 to V01=V11+A1+A2 (step S37). V11 is a movement speed of the vehicle 10 starting in step S22 of FIG. 7.

Second Control of Movement Speed

Figure 9:
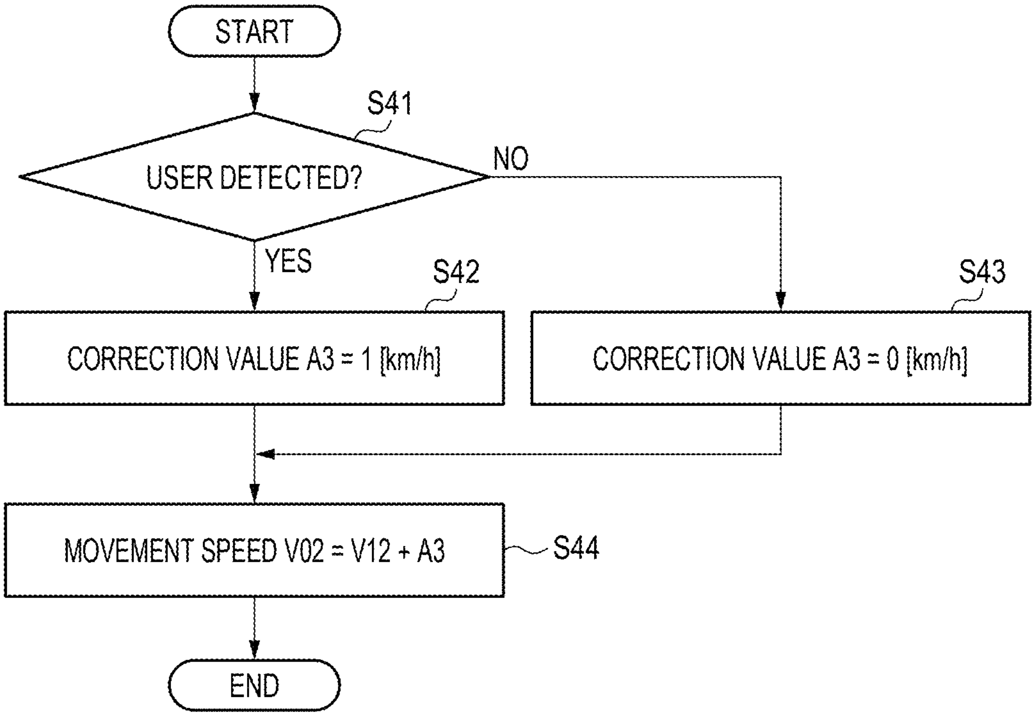
FIG. 9 is a flowchart showing an example of a second control of the movement speed according to a determination result.

FIG. 9 is a flowchart showing an example of the second control of the movement speed according to the determination result. The second control is the control in step S28 in FIG. 7.

First, the vehicle 10 determines whether the user is detected (step S41). The user being detected means that it is detected that the face of the user is looking at the vehicle 10 based on the external environment recognition data. In step S41, if the user is detected (step S41: Yes), the vehicle 10 sets the correction value A3 for adjusting the movement speed of the vehicle 10 to A3=1 [km/h] (step S42). In step S41, if the user is not detected (step S41: No), the vehicle 10 sets the correction value A3 for adjusting the movement speed of the vehicle 10 to A3=0 [km/h] (step S43).

After setting the correction value A3 in step S42 or step S43, the vehicle 10 sets a movement speed V02 of the vehicle 10 to V02=V12+A3 (step S44). V12 may be the same as V11 or may be different. However, V01 < V02, that is, V11+A1+A2 < V12+A3.

Vehicle Calling in Parking Lot

Next, vehicle calling in a parking lot 70 will be described with reference to FIGS. 10 to 12.

Figure 10:
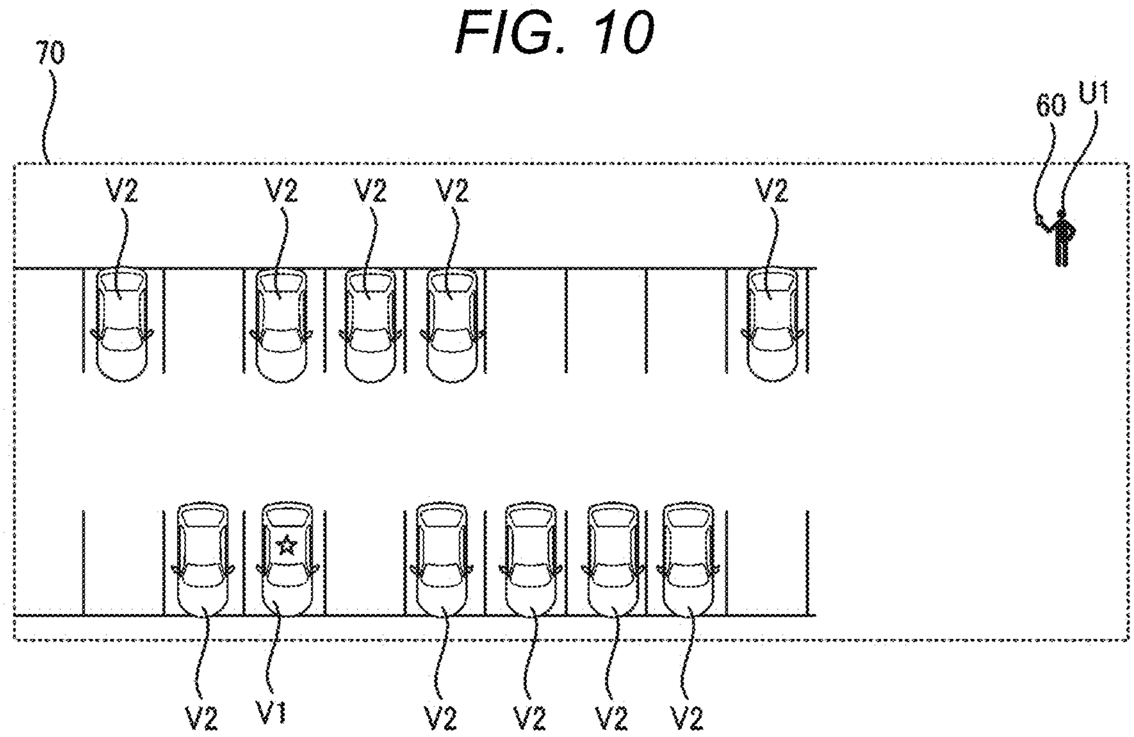
FIG. 10 is a diagram showing an example of a calling start state in which the user calls for a vehicle.

FIG. 10 is a diagram showing an example of a calling start state in which the user calls for a vehicle. It is assumed that a user U1 is intended to call for a host vehicle V1, which is parked in the parking lot 70, to a location where the user U1 is present using the information terminal 60 carried by the user U1. In addition to the host vehicle V1 of the user U1, a plurality of other vehicles V2 are parked in the parking lot 70. When an application for remotely causing the host vehicle V1 to exit is started on the information terminal 60, face authentication of the user U1 is performed using the camera of the information terminal 60, and then remote exiting of the host vehicle V1 is started in response to the operation of the user U1. The host vehicle V1 is an example of a "moving object" in the present disclosure.

Figure 11:
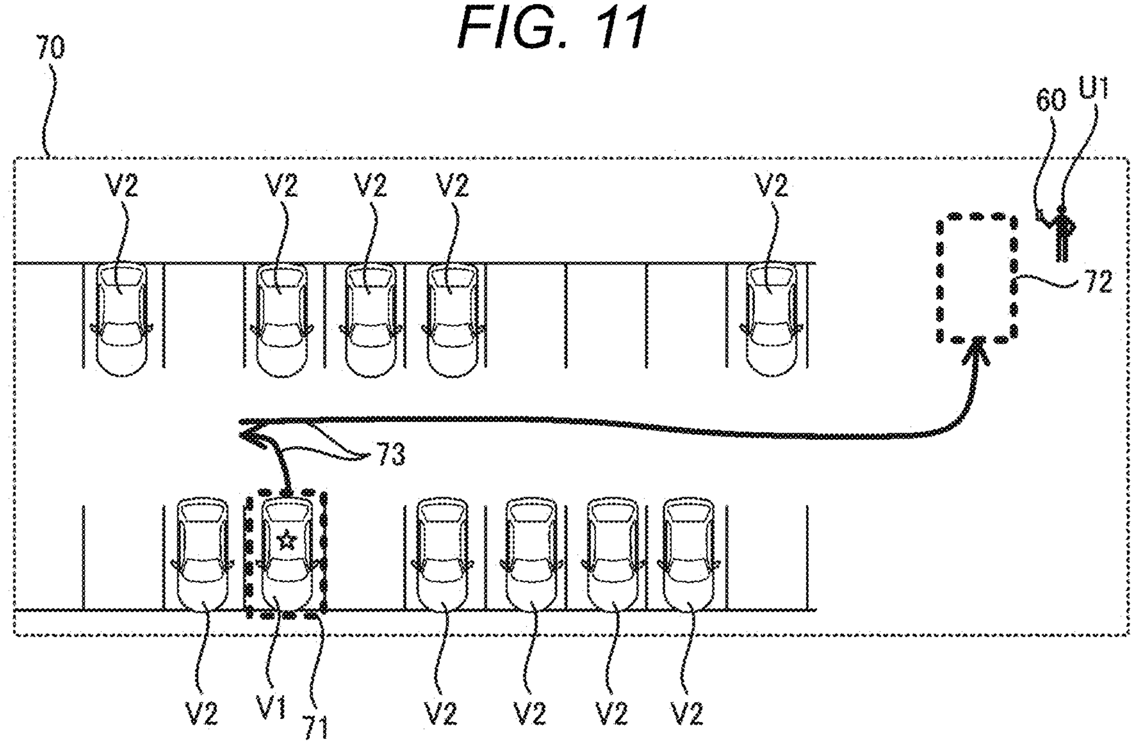
FIG. 11 is a diagram showing an example of an exit route of a host vehicle V1.

FIG. 11 is a diagram showing an example of an exit route of the host vehicle V1. When the host vehicle V1 receives a movement instruction instructing exiting from the information terminal 60, an exit route 73 from a parking position 71 of the host vehicle V1 to an exit position 72 to which the host vehicle V1 is called is generated based on external environment recognition data acquired by the cameras and the like, and movement control of the host vehicle V1 is performed based on the generated exit route 73.

When the distance between the host vehicle V1 and the information terminal 60 is, for example, so far (greater than the first predetermined value) that the face of the user U1 cannot be recognized in the camera image, the host vehicle V1 performs the first control that controls the movement speed based on the state of communication with the information terminal 60. In the first control, when the host vehicle V1 is in the first confirmation state in which the user U1 can confirm the host vehicle V1, for example, when the section between the host vehicle V1 and the information terminal 60 is a linear section, the movement speed of the host vehicle V1 is set to the first speed that is faster than when the host vehicle V1 is not in the first confirmation state.

When the distance between the host vehicle V1 and the information terminal 60 is, for example, a distance (less than the first predetermined value) at which the face of the user U1 can be recognized in the camera image, the host vehicle V1 performs the second control to control the movement speed based on the external environment recognition data acquired by the cameras and the like. In the second control, when the host vehicle V1 is in the second confirmation state in which the user U1 is confirming the host vehicle V1, for example, when it can be determined based on the external environment recognition data that the face of the user U1 is facing toward the host vehicle V1, the movement speed of the host vehicle V1 is set to the second speed that is faster than when the host vehicle V1 is not in the second confirmation state and faster than the first speed in the first control.

Figure 12:
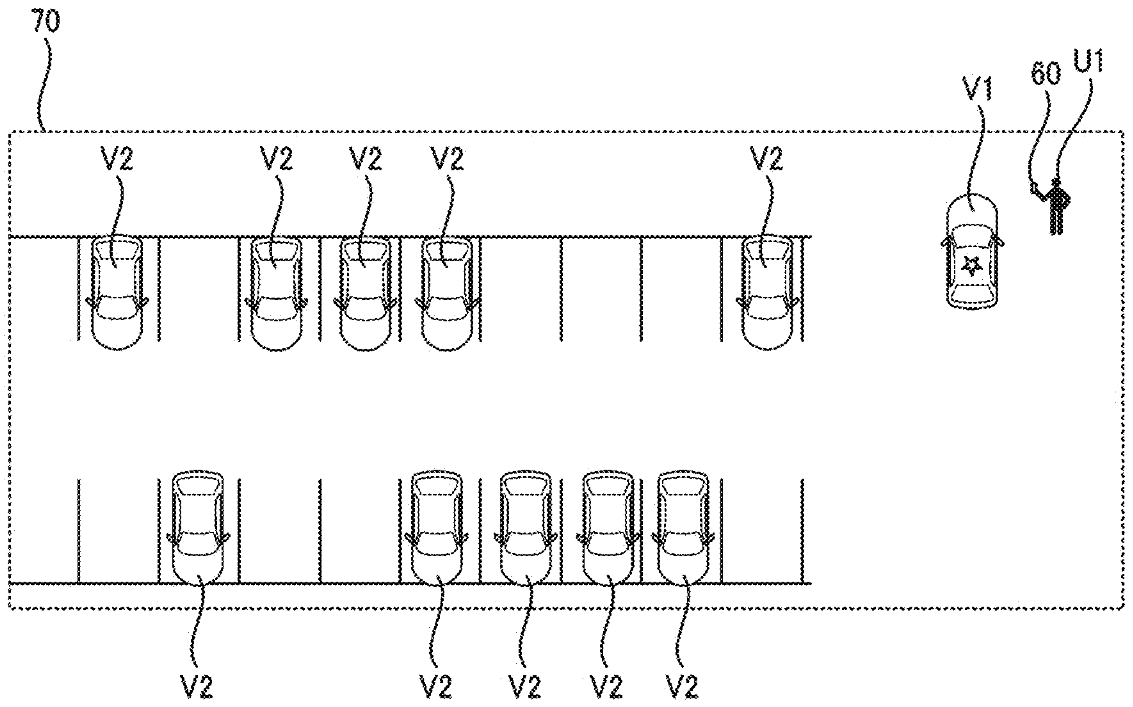
FIG. 12 is a diagram showing an example of a state in which calling for the host vehicle V1 is completed.

FIG. 12 is a diagram showing an example of a state in which calling for the host vehicle V1 is completed. Based on the distance between the host vehicle V1 and the information terminal 60, the host vehicle V1 switches between the first control and the second control, which control the movement speed of the host vehicle V1 in the movement control, and moves to the exit position 72 (see FIG. 11) to which the host vehicle V1 is called by the user U1.

As described above, the control device (control ECU 20) of the present embodiment performs the first control in which the movement speed of the host vehicle V1 during exiting control (movement control) is controlled based on the state of communication when the distance between the host vehicle V1 (vehicle 10) parked in the parking lot 70 and the information terminal 60 carried by the user U1 is equal to or greater than the first predetermined value, and performs the second control in which the movement speed of the vehicle 10 during the exiting control is controlled based on the external environment recognition data when the distance between the host vehicle V1 and the information terminal 60 is less than the first predetermined value. Therefore, it is possible to change the movement speed of the host vehicle V1 by appropriate control according to the distance between the host vehicle V1 and the information terminal 60 on the movement route, and the movement control of the vehicle 10 can be efficiently performed while ensuring safety. As a result, even when the host vehicle V1 is parked in a large parking lot 70 with a long movement route, a movement time to move the host vehicle V1 to the exit position can be shortened, and an exit operation time on the information terminal 60 operated by the user U1 to cause the host vehicle V1 to exit can be shortened.

When the distance between the host vehicle V1 and the information terminal 60 is equal to or greater than the first predetermined value, the control device of the present embodiment determines whether the first confirmation state in which the user U1 can confirm the host vehicle V1 is established based on the state of communication with the information terminal 60, and when the first confirmation state is established, increases the movement speed of the host vehicle V1 as compared with when the first confirmation state is not established. When the distance between the host vehicle V1 and the information terminal 60 is less than the first predetermined value, the control device determines whether the second confirmation state in which the user U1 is confirming the host vehicle V1 is established based on the external environment recognition data acquired by the cameras of the host vehicle V1, and when the second confirmation state is established, increases the movement speed of the host vehicle V1 as compared with when the second confirmation state is not established. As a result, it is possible to appropriately control the movement speed of the host vehicle V1 regardless of whether the distance between the host vehicle V1 and the information terminal 60 is equal to or greater than the first predetermined value or less than the first predetermined value, and to efficiently perform the movement control on the host vehicle V1 to the exit position for example, while ensuring safety.

When the distance between the host vehicle V1 and the information terminal 60 is equal to or greater than the first predetermined value, the control device of the present embodiment determines that the first confirmation state in which the user U1 can confirm the host vehicle V1 is established in the case where the section between the host vehicle V1 and the information terminal 60 is a linear section and the host vehicle V1 is visible from the information terminal 60, or where the information terminal 60 is directed toward the host vehicle V1 (where it can be inferred that the user U1 is looking toward the host vehicle V1). Therefore, the movement speed of the host vehicle V1 can be appropriately controlled, and the movement control on the host vehicle V1 to, for example, the exit position can be efficiently performed while ensuring safety.

When the distance between the host vehicle V1 and the information terminal 60 is less than the first predetermined value, the control device of the present embodiment determines that the second confirmation state in which the user U1 is confirming the host vehicle V1 is established, in the case where it is detected based on the external environment recognition data that the user U1 is in a state of confirming and looking at the host vehicle V1. Therefore, the movement speed of the host vehicle V1 can be appropriately controlled, and the movement control on the host vehicle V1 to, for example, the exit position can be efficiently performed while ensuring safety.

The control device of the present embodiment makes the second speed of the vehicle 10 in the second control when the distance between the host vehicle V1 and the information terminal 60 is less than the first predetermined value higher than the first speed of the vehicle 10 in the first control when the distance is equal to or greater than the first predetermined value. In this way, it is possible to set the movement speed of the host vehicle V1 appropriately according to the distance between the host vehicle V1 and the information terminal 60, thereby enabling efficient movement control on the moving object while ensuring safety.

Modification of Processing of Information Terminal 60

Figure 13:
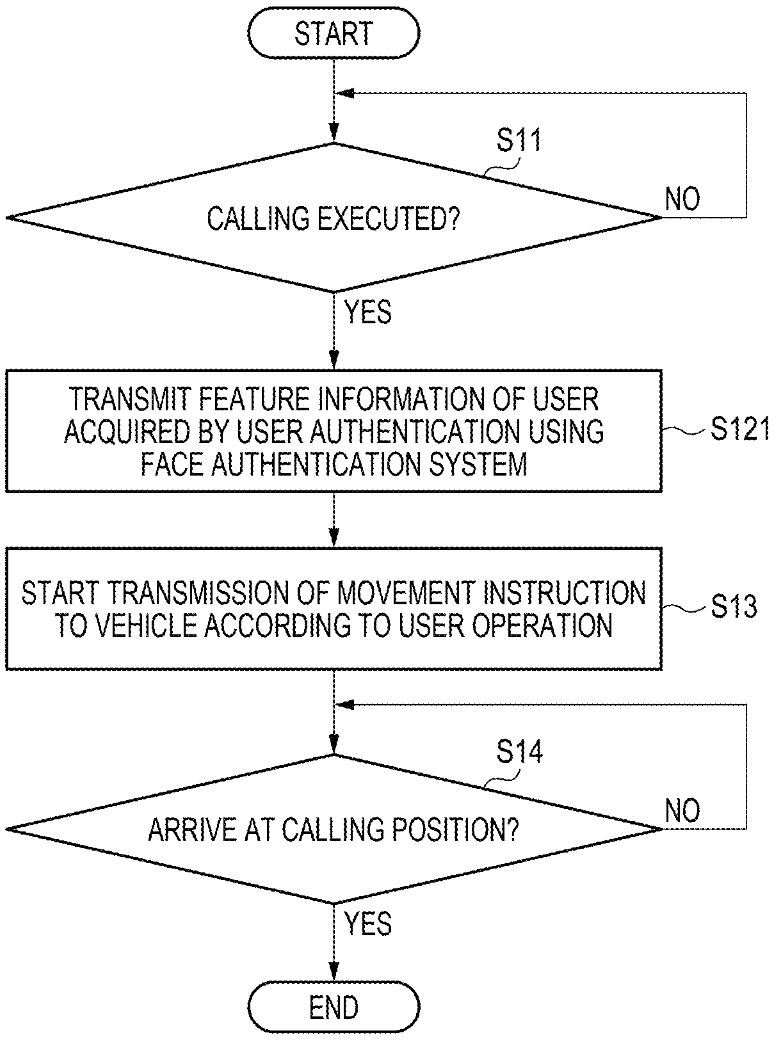
FIG. 13 is a flowchart showing a modification of processing of the information terminal 60 during exiting of the vehicle 10.

FIG. 13 is a flowchart showing a modification of the processing of the information terminal 60 during exiting of the vehicle 10. First, similarly to the processing of step S11 in FIG. 5, the information terminal 60 (processor 61) determines whether calling is executed by the user to call for the vehicle 10 to an exit position (step S11).

In step S11, if calling is executed (step S11: Yes), the information terminal 60 performs user authentication using a face authentication system, and transmits feature information of the user acquired through user authentication to the vehicle 10 (step S121).

The processing of step S13 and step S14 is similar to the processing of step S13 and step S14 in FIG. 5.

Modification of Processing of Vehicle 10

Figure 14:
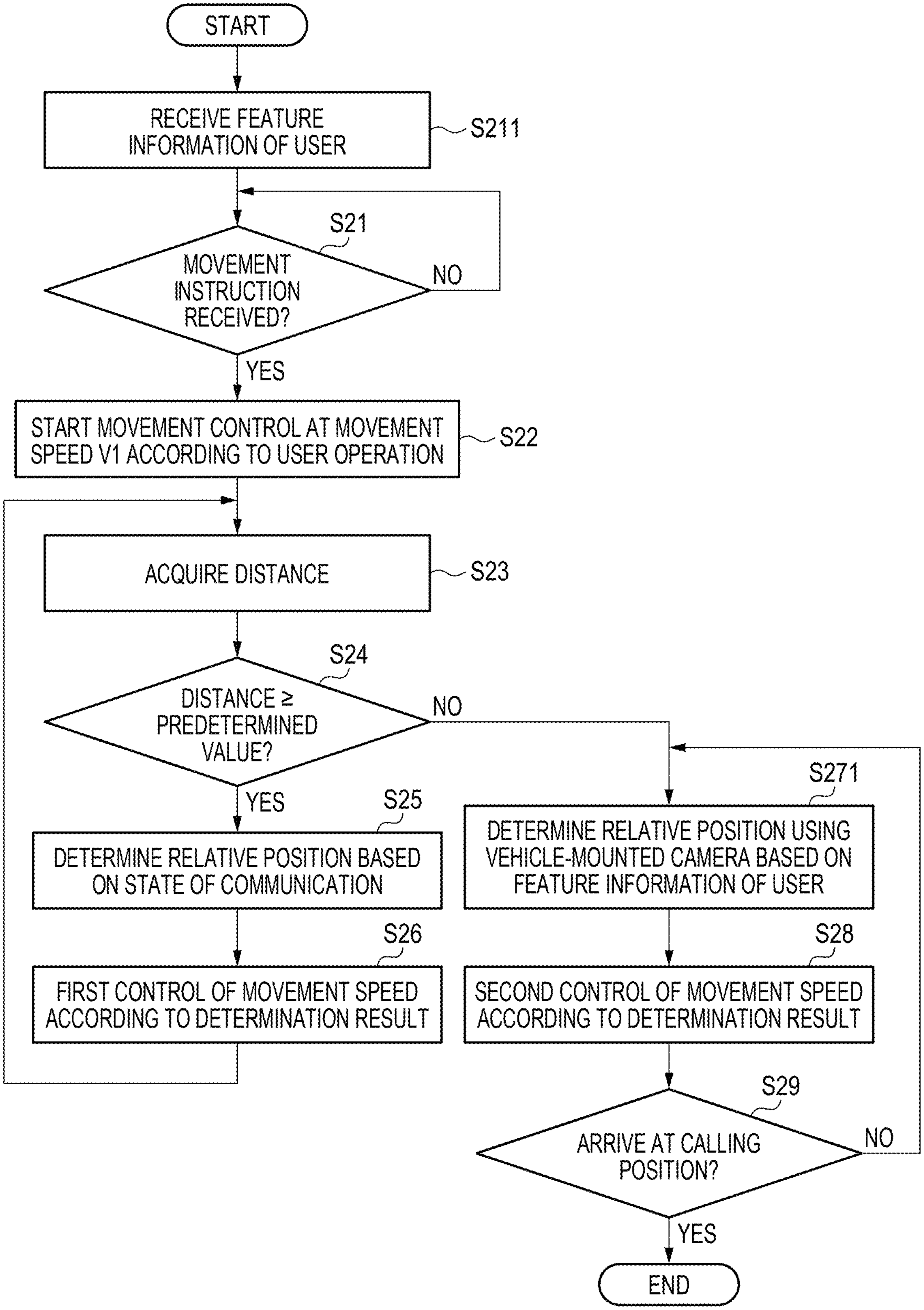
FIG. 14 is a flowchart showing a modification of processing of the vehicle 10 during exiting.

FIG. 14 is a flowchart showing a modification of the processing of the vehicle 10 during exiting. In the processing of the modification, first, the vehicle 10 (control ECU 20) receives the feature information of the user transmitted from the information terminal 60 (step S211).

The processing from step S21 to step S26 is similar to the processing from step S21 to step S26 in FIG. 7.

In step S24, if the distance between the vehicle 10 and the information terminal 60 is not equal to or greater than the predetermined value (step S24: No), the vehicle 10 determines a relative position using a vehicle-mounted camera based on the feature information of the user received in step S211 (step S271). As described in step S27 of FIG. 7, determining the relative position using the vehicle-mounted camera means determining whether a state (second confirmation state) in which the user is confirming the vehicle 10 is established based on the external environment recognition data acquired by the camera. The second confirmation state refers to, for example, a case where it is detected that the face of the user is facing toward the vehicle 10 based on the external environment recognition data. Therefore, based on the feature information of the user means to accurately determine whether the user carrying the information terminal 60 is a user to communicate with by adding the feature information of the user to the external environment recognition data.

The processing of step S28 and step S29 is similar to the processing of step S28 and step S29 in FIG. 7.

In this way, according to the modification of the processing of the vehicle 10, in the second control in which the movement speed of the vehicle 10 is controlled based on the external environment recognition data, whether the second confirmation state in which the user is confirming the vehicle 10 is established is determined based on the external environment recognition data and the feature information of the user obtained by image authentication of the information terminal 60. In this way, it is possible to more accurately determine whether a state in which the target user is confirming the vehicle 10 is established, and it is possible to efficiently perform the movement control on the moving object while ensuring safety.

Modification of First Control of Movement Speed

Figure 15:
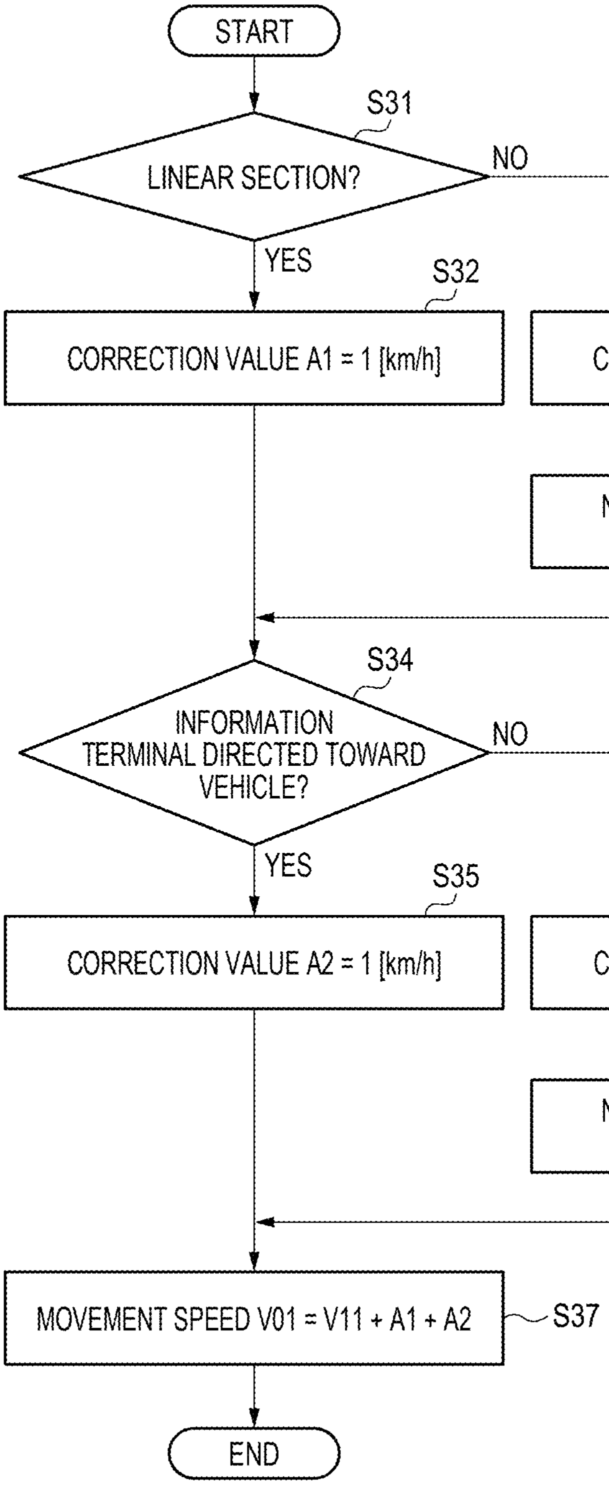
FIG. 15 is a flowchart showing a modification of the first control of the movement speed according to a determination result.

FIG. 15 is a flowchart showing a modification of the first control of the movement speed according to a determination result. The processing from step S31 to step S33 is similar to the processing from step S31 to step S33 in FIG. 8.

After setting the correction value A1 to A1=0 [km/h] in step S33, the vehicle 10 transmits a notification to the information terminal 60 (user) to prompt for confirming the vehicle 10 being called (step S331). The notification prompting for the confirmation is, for example, a notification prompting for moving to a position where the vehicle 10 can be seen. After performing the notification prompting for confirming the vehicle 10, the vehicle 10 proceeds to step S34.

The processing from step S34 to step S36 is similar to the processing from step S34 to step S36 in FIG. 8.

After setting the correction value A2 to A2=0 [km/h] in step S36, the vehicle 10 transmits a notification to the information terminal 60 (user) to prompt for confirming the vehicle 10 being called (step S361). The notification prompting for the confirmation is, for example, a notification prompting for looking toward the vehicle 10. After performing the notification prompting for confirming the vehicle 10, the vehicle 10 proceeds to step S37. The processing of step S37 is similar to the processing of step S37 in FIG. 8.

Modification of Second Control of Movement Speed

Figure 16:
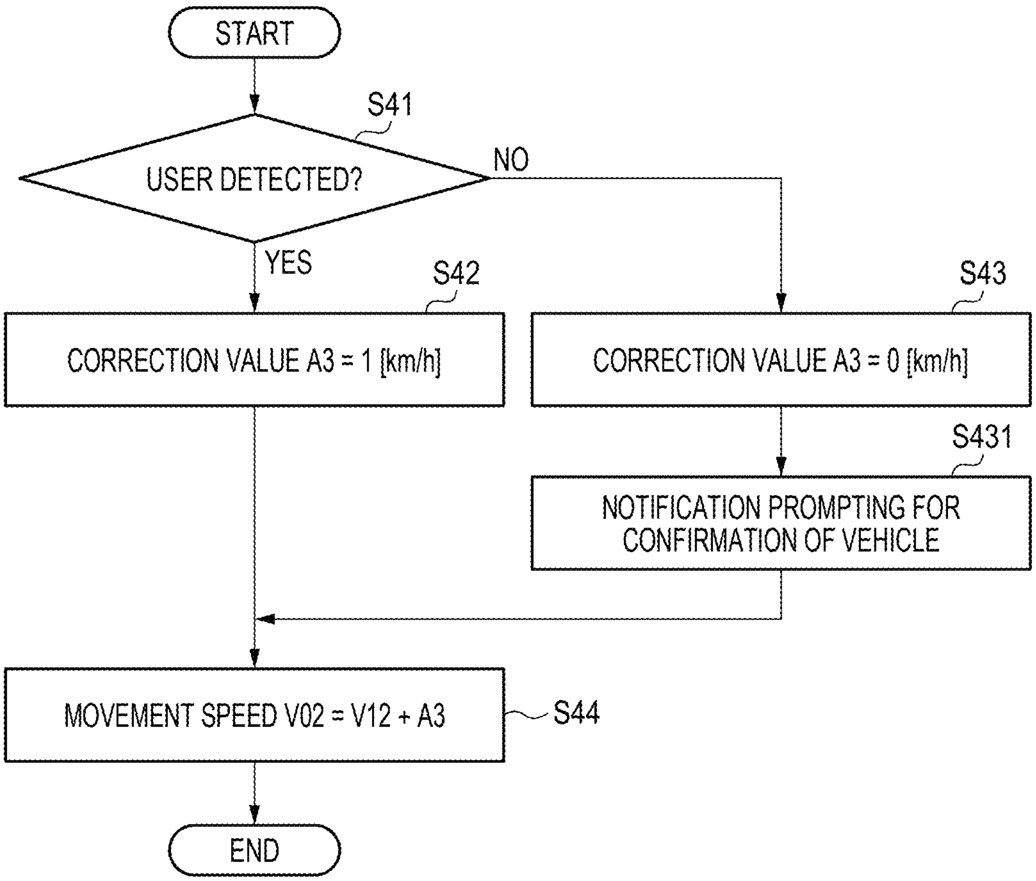
FIG. 16 is a flowchart showing a modification of the second control of the movement speed according to a determination result.

FIG. 16 is a flowchart showing a modification of the second control of the movement speed according to a determination result. The processing from step S41 to step S43 is similar to the processing from step S41 to step S43 in FIG. 9.

After setting the correction value A3 to A3=0 [km/h] in step S43, the vehicle 10 transmits a notification to the information terminal 60 (user) to prompt for confirming the vehicle 10 being called (step S431). The notification prompting for the confirmation is, for example, a notification prompting the user to find the vehicle 10 and turn his or her gaze toward the vehicle 10. After performing the notification prompting for confirming the vehicle 10, the vehicle 10 proceeds to step S44. The processing of step S44 is similar to the processing of step S44 in FIG. 9.

Display Screen of Information Terminal 60

Figure 17:
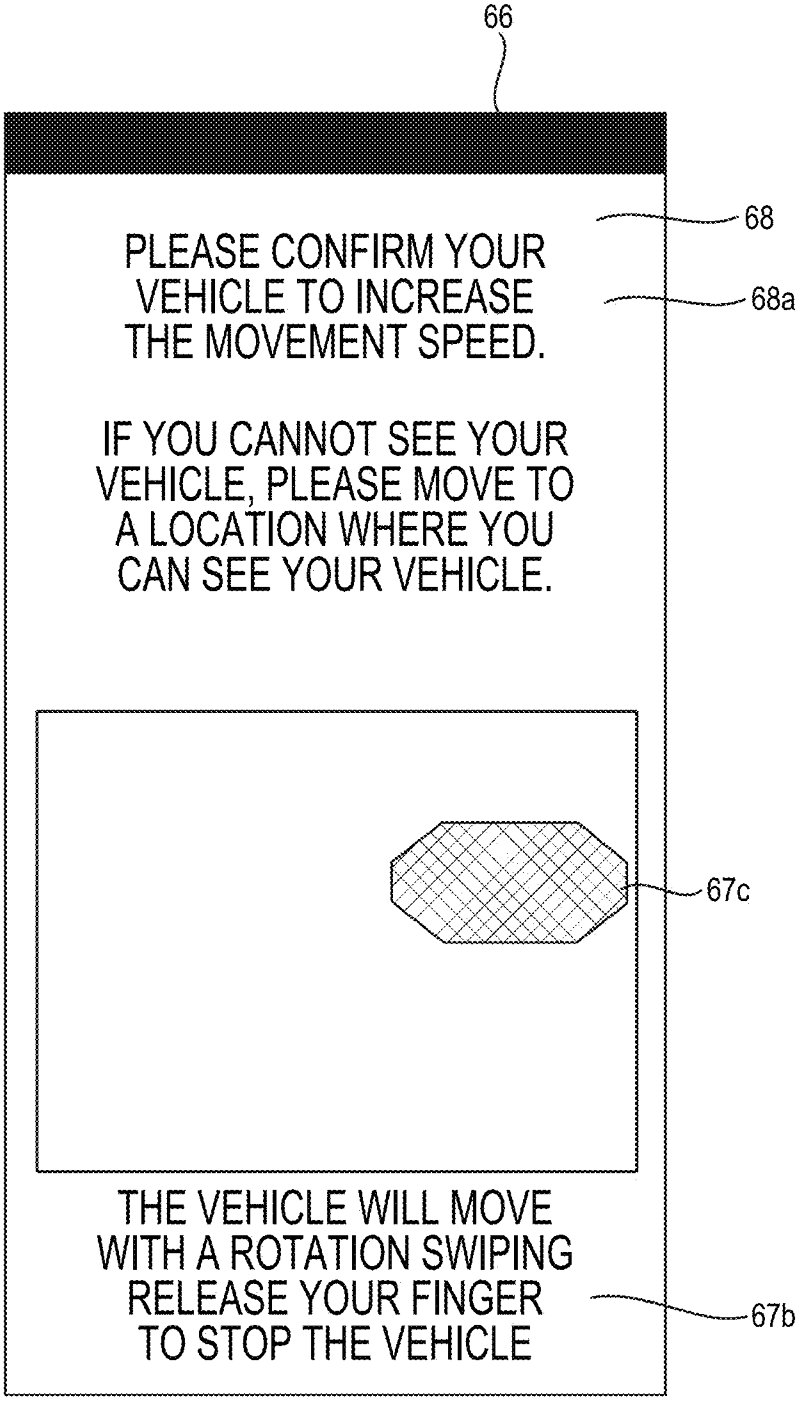
FIG. 17 is a diagram showing an example of a vehicle confirmation notification screen 68 displayed on the display screen 66 of the information terminal 60.

FIG. 17 is a diagram showing an example of a vehicle confirmation notification screen 68 displayed on the display screen 66 of the information terminal 60. The vehicle confirmation notification screen 68 is an example of the screen displayed in steps S331 and S361 in FIG. 15 and step S431 in FIG. 16.

As shown in FIG. 17, the vehicle confirmation notification screen 68 displays a message 68*a* such as "Please confirm your vehicle to increase the movement speed. If you cannot see your vehicle, please move to a location where you can see your vehicle." The vehicle confirmation notification screen 68 displays a guide message 67*b*, which is displayed while the vehicle 10 is being called, such as "The vehicle will move with a rotation swiping. Release your finger to stop the vehicle.", and a moving icon 67*c* that moves following a touch position by the user during the rotation swiping operation.

According to the modifications of the first control and the second control of the movement speed, when it is determined that the user cannot confirm the vehicle 10 in the first control that controls the movement speed of the vehicle 10 based on the state of communication, and when it is determined that the user is not confirming the vehicle 10 in the second control that controls the movement speed of the vehicle 10 based on the external environment recognition data, the control device performs a notification to prompt the user to confirm the vehicle 10. In this way, it is possible to guide the user so that the state of the user and the moving object becomes the first confirmation state or the second confirmation state, thereby enabling efficient movement control on the moving object while ensuring safety.

Note that the control method described in the embodiment described above may be implemented by executing a control program prepared in advance by a computer. The control program is stored in a computer-readable storage medium and executed by being read from the storage medium. In addition, the control program may be provided in a form stored in a non-transitory storage medium such as a flash memory, or may be provided via a network such as the Internet. The computer that executes the present control program may be provided in the control device, may be provided in an electronic device such as a smartphone, a tablet terminal, or a personal computer that can communicate with the control device, or may be provided in a server device that can communicate with the control device and the electronic device.

The embodiment of the present disclosure has been described above, but the present disclosure is not limited to the embodiment described above, and modifications, improvements, and the like may be made as appropriate.

In the above-described embodiment, an example in which the moving object is a vehicle (four-wheeled automobile) has been described, but the moving object is not limited thereto. For example, the moving object may be a vehicle such as a two-wheeled vehicle or a Segway. Further, the idea of the present disclosure is not limited to the vehicle, and may also be applied to a robot, a ship, an aircraft, or the like that includes a drive source and is movable by power of the drive source.

In the present specification, at least the following matters are described. Although corresponding constituent elements or the like in the embodiment described above are shown in parentheses, the present disclosure is not limited thereto.

(1) A control device (control ECU 20) for a moving object (vehicle 10), the control device including:

a communication unit (communication unit 55) configured to communicate with an information terminal carried by a user of the moving object;

an external environment recognition unit (external environment recognition unit 56) configured to acquire external environment recognition data of the moving object; and a control unit (control unit 57) configured to perform movement control of the moving object based on an instruction from the information terminal, in which depending on a distance between the moving object and the information terminal, the control unit switches between a first control in which a movement speed of the moving object in the movement control is controlled based on a state of the communication, and a second control the movement speed of the moving object in the movement control is controlled based on the external environment recognition data.

According to (1), the control on the movement speed of the moving object can be switched between control based on the state of communication and control based on the external environment recognition data depending on the distance between the moving object and the information terminal on the movement route. Therefore, it is possible to appropriately control the movement speed of the moving object in a section according to the distance, and it is possible to efficiently perform movement control on the moving object while ensuring safety.

(2) The control device according to (1), in which the control unit performs the first control when the distance is equal to or greater than a first predetermined value, and the control unit performs the second control when the distance is less than the first predetermined value.

According to (2), when the distance between the moving object and the information terminal is equal to or greater than the first predetermined value, the movement speed of the moving object is controlled by the first control based on the state of communication, and when the distance is less than the first predetermined value, the movement speed of the moving object is controlled by the second control based on the external environment recognition data. Therefore, the movement speed of the moving object can be appropriately controlled according to the distance between the moving object and the information terminal, and the movement control on the moving object can be efficiently performed while ensuring safety.

(3) The control device according to (1) or (2), in which in the first control, the control unit determines whether a first confirmation state is established in which the user is capable of confirming the moving object based on the communication, and controls the movement speed of the moving object in the movement control based on a determination result of whether the first confirmation state is established.

According to (3), when the distance between the moving object and the information terminal is equal to or greater than the first predetermined value, it is possible to determine whether the moving object can be confirmed by the user based on the state of communication, and to control the movement speed of the moving object. Therefore, when the distance between the moving object and the information terminal is equal to or greater than the first predetermined value, the movement speed of the moving object can be appropriately controlled, and therefore, the movement control on the moving object can be efficiently performed while ensuring safety.

(4) The control device according to (3), in which in the first control, when it is determined that the first confirmation state is established, the control unit increases the movement speed of the moving object in the movement control as compared with when it is determined that the first confirmation state is not established.

As in (4), when the distance between the moving object and the information terminal is equal to or greater than the first predetermined value, the movement speed of the moving object is increased when the moving object can be confirmed by the user, thereby enabling efficient movement control on the moving object while ensuring safety.

(5) The control device according to (3) or (4), in which the control unit determines that the first confirmation state is established when a section between the moving object and the information terminal is a linear section.

As in (5), to establish a state in which the user can confirm the moving object, it is preferable that the section between the moving object and the information terminal is a linear section.

(6) The control device according to any one of (3) to (5), in which the control unit determines that the first confirmation state is established when the information terminal is directed toward the moving object.

As in (6), to establish a state in which the user can confirm the moving object, it is preferable that the information terminal is directed toward the moving object.

(7) The control device according to any one of (3) to (6), in which the control unit performs a notification to prompt the user to confirm the moving object when it is determined that the first confirmation state is not established.

As in (7), by performing a notification prompting the user to confirm the moving object, the state of the user and the moving object can be put into the first confirmation state, thereby enabling efficient movement control on the moving object while ensuring safety.

(8) The control device according to any one of (1) to (7), in which in the second control, the control unit determines whether a second confirmation state is established in which the user is confirming the moving object based on the external environment recognition data, and controls the movement speed of the moving object in the movement control based on a determination result of whether the second confirmation state is established.

According to (8), when the distance between the moving object and the information terminal is less than the first predetermined value, it is possible to determine whether the user is confirming the moving object based on the external environment recognition data, and to control the movement speed of the moving object. Therefore, when the distance between the moving object and the information terminal is less than the first predetermined value, the movement speed of the moving object can be appropriately controlled, and therefore, the movement control on the moving object can be efficiently performed while ensuring safety.

(9) The control device according to (8), in which in the second control, when it is determined that the second confirmation state is established, the control unit increases the movement speed of the moving object in the movement control as compared with when it is determined that the second confirmation state is not established.

As in (9), when the distance between the moving object and the information terminal is less than the first predetermined value, the movement speed of the moving object is increased when the user is confirming the moving object, thereby enabling efficient movement control on the moving object while ensuring safety.

(10) The control device according to (8) or (9), in which in the second control, the control unit determines that the second confirmation state is established when the user is detected based on the external environment recognition data.

As in (10), to establish a state in which the user is confirming the moving object, it is preferable that the user can detect based on the external environment recognition data.

(11) The control device according to (10), in which the control unit performs the movement control in a state in which image authentication of the user is performed in the information terminal, the control unit receives feature information of the user acquired in the image authentication from the information terminal, and in the second control, the control unit detects the user based on the external environment recognition data and the feature information of the user.

According to (11), by detecting the user based on the external environment recognition data and feature information of the user, the user can be identified more quickly and accurately, and the movement control on the moving object can be efficiently performed while ensuring safety.

(12) The control device according to any one of (8) to (11), in which the control unit performs a notification to prompt the user to confirm the moving object when it is determined that the second confirmation state is not established.

As in (12), by performing a notification prompting the user to confirm the moving object, the state of the user and the moving object can be put into the second confirmation state, thereby enabling efficient movement control on the moving object while ensuring safety.

(13) The control device according to any one of (8) to (12), in which in the first control, the control unit determines, based on the communication, whether a first confirmation state is established in which the user is capable of confirming the moving object, and when it is determined that the first confirmation state is established, sets the movement speed of the moving object in the movement control to a first speed that is higher than when it is determined that the first confirmation state is not established, and in the second control, when it is determined that the second confirmation state is established, the control unit sets the movement speed of the moving object in the movement control to a second speed that is higher than when it is determined that the second confirmation state is not established and higher than the first speed.

As in (13), by making the second speed of the moving object in the second control when the distance between the moving object and the information terminal is less than the first predetermined value higher than the first speed of the moving object in the first control when the distance is equal to or greater than the first predetermined value, the speed of the moving object can be appropriately controlled according to the distance, and the movement control on the moving object can be efficiently performed while ensuring safety.

(14) The control device according to any one of (1) to (13), in which in the movement control of the moving object, when a distance between the moving object and an obstacle is equal to or greater than a second predetermined value, the control unit increases the movement speed of the moving object in the movement control as compared with when the distance between the moving object and the obstacle is less than the second predetermined value.

As in (14), it is preferable to increase the movement speed of the moving object when the distance between the moving object and an obstacle is large.

(15) A control method using a control device for a moving object, the control device including a communication unit configured to communicate with an information terminal carried by a user of the moving object; an external environment recognition unit configured to acquire external environment recognition data of the moving object; and a control unit configured to perform movement control of the moving object based on an instruction from the information terminal, the control method including:

depending on a distance between the moving object and the information terminal, switching, by the control unit, between a first control in which a movement speed of the moving object in the movement control is controlled based on a state of the communication, and a second control in which the movement speed of the moving object in the movement control is controlled based on the external environment recognition data.

According to (15), the control on the movement speed of the moving object can be switched between control based on the state of communication and control based on the external environment recognition data depending on the distance between the moving object and the information terminal on the movement route. Therefore, it is possible to appropriately control the movement speed of the moving object in a section according to the distance, and it is possible to efficiently perform movement control on the moving object while ensuring safety.

(16) A non-transitory computer-readable storage medium storing a control program for a control device for a moving object, the control device including a communication unit configured to communicate with an information terminal carried by a user of the moving object; an external environment recognition unit configured to acquire external environment recognition data of the moving object; and a control unit configured to perform movement control of the moving object based on an instruction from the information terminal, the control program causing the control unit to execute a process including:

depending on a distance between the moving object and the information terminal, switching between a first control in which a movement speed of the moving object in the movement control is controlled based on a state of the communication, and a second control in which the movement speed of the moving object in the movement control is controlled based on the external environment recognition data.

According to (16), the control on the movement speed of the moving object can be switched between control based on the state of communication and control based on the external environment recognition data depending on the distance between the moving object and the information terminal on the movement route. Therefore, it is possible to appropriately control the movement speed of the moving object in a section according to the distance, and it is possible to efficiently perform movement control on the moving object while ensuring safety.

What is claimed is:

1. A control device for a moving object, the control device comprising:

a communication unit configured to communicate with an information terminal carried by a user of the moving object;

an external environment recognition unit configured to acquire external environment recognition data of the moving object; and a control unit configured to perform remote movement control of the moving object that is executed based on an instruction from the information terminal by the user who is outside the moving object and that requires a confirmation of the moving object by the user, wherein the control unit determines a confirmation state as to whether the user is capable of confirming the moving object, and controls a movement speed of the moving object based on a determination result, in response to a distance between the moving object and the information terminal being equal to or greater than a first predetermined value, the control unit determines the confirmation state based on a state of the communication to perform a first control, and in response to the distance between the moving object and the information terminal being less than the first predetermined value, the control unit determines the confirmation state based on the external environment recognition data to perform a second control, wherein the communication unit, the external environment recognition unit, and the control unit are each implemented via at least one processor.

2. The control device according to claim 1, wherein in the first control, when it is determined that a first confirmation state in which the user is capable of confirming the moving object is established, the control unit causes the moving object to move at a first movement speed, and when it is determined that the first confirmation state is not established, the control unit causes the moving object to move at a second movement speed that is lower than the first movement speed.

3. The control device according to claim 2, wherein the control unit determines that the first confirmation state is established when a section between the moving object and the information terminal is a linear section.

4. The control device according to claim 2, wherein the control unit determines that the first confirmation state is established when the information terminal is directed toward the moving object.

5. The control device according to claim 2, wherein the control unit performs a notification to prompt the user to confirm the moving object when it is determined that the first confirmation state is not established.

6. The control device according to claim 1, wherein in the second control, the control unit determines whether a second confirmation state is established in which the user is confirming the moving object based on the external environment recognition data, and controls the movement speed of the moving object in the remote movement control based on a determination result of whether the second confirmation state is established.

7. The control device according to claim 6, wherein in the second control, when it is determined that the second confirmation state is established, the control unit increases the movement speed of the moving object in the remote movement control as compared with when it is determined that the second confirmation state is not established.

8. The control device according to claim 6, wherein in the second control, the control unit determines that the second confirmation state is established when the user is detected based on the external environment recognition data.

9. The control device according to claim 8, wherein the control unit performs the remote movement control in a state in which image authentication of the user is performed in the information terminal, the control unit receives feature information of the user acquired in the image authentication from the information terminal, and in the second control, the control unit detects the user based on the external environment recognition data and the feature information of the user.

10. The control device according to claim 6, wherein the control unit performs a notification to prompt the user to confirm the moving object when it is determined that the second confirmation state is not established.

11. The control device according to claim 6, wherein in the first control, the control unit determines, based on the communication, whether a first confirmation state is established in which the user is capable of confirming the moving object, and when it is determined that the first confirmation state is established, sets the movement speed of the moving object in the remote movement control to a first speed that is higher than when it is determined that the first confirmation state is not established, and in the second control, when it is determined that the second confirmation state is established, the control unit sets the movement speed of the moving object in the remote movement control to a second speed that is higher than when it is determined that the second confirmation state is not established and higher than the first speed.

12. The control device according to claim 1, wherein in the remote movement control of the moving object, when a distance between the moving object and an obstacle is equal to or greater than a second predetermined value, the control unit increases the movement speed of the moving object in the remote movement control as compared with when the distance between the moving object and the obstacle is less than the second predetermined value.

13. A control method using a control device for a moving object, the control device including a communication unit configured to communicate with an information terminal carried by a user of the moving object; an external environment recognition unit configured to acquire external environment recognition data of the moving object; and a control unit configured to perform remote movement control of the moving object that is executed based on an instruction from the information terminal by the user who is outside the moving object and that requires a confirmation of the moving object by the user, the control method comprising:

determining a confirmation state as to whether the user is capable of confirming the moving object, and controlling a movement speed of the moving object based on a determination result;

in response to a distance between the moving object and the information terminal being equal to or greater than a first predetermined value, determining the confirmation state based on a state of the communication to perform a first control; and in response to the distance between the moving object and the information terminal being less than the first predetermined value, determining the confirmation state based on the external environment recognition data to perform a second control.

14. A non-transitory computer-readable storage medium storing a control program for a control device for a moving object, the control device including a communication unit configured to communicate with an information terminal carried by a user of the moving object; an external environment recognition unit configured to acquire external environment recognition data of the moving object; and a control unit configured to perform remote movement control of the moving object that is executed based on an instruction from the information terminal by the user who is outside the moving object and that requires a confirmation of the moving object by the user, the control program causing the control unit to execute a process comprising:

determining a confirmation state as to whether the user is capable of confirming the moving object, and controlling a movement speed of the moving object based on a determination result;

in response to a distance between the moving object and the information terminal being equal to or greater than a first predetermined value, determining the confirmation state based on a state of the communication to perform a first control; and in response to the distance between the moving object and the information terminal being less than the first predetermined value, determining the confirmation state based on the external environment recognition data to perform a second control.

* * * * *